United States Patent
Tanabe et al.

(10) Patent No.: US 10,071,705 B2
(45) Date of Patent: Sep. 11, 2018

(54) SEAT BELT ASSIST DEVICE, AND VEHICULAR SEAT

(71) Applicant: TS TECH CO., LTD., Asaka-shi, Saitama (JP)

(72) Inventors: Jinichi Tanabe, Tochigi (JP); Atsushi Yamabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 94 days.

(21) Appl. No.: 15/023,592

(22) PCT Filed: Sep. 10, 2014

(86) PCT No.: PCT/JP2014/073877
§ 371 (c)(1),
(2) Date: Mar. 21, 2016

(87) PCT Pub. No.: WO2015/045862
PCT Pub. Date: Apr. 2, 2015

(65) Prior Publication Data
US 2016/0207496 A1    Jul. 21, 2016

(30) Foreign Application Priority Data
Sep. 26, 2013   (JP) .................................. 2013-200404

(51) Int. Cl.
*B60R 22/03*     (2006.01)
*B60R 22/48*     (2006.01)
(Continued)

(52) U.S. Cl.
CPC ............ *B60R 22/03* (2013.01); *B60R 21/207* (2013.01); *B60R 22/20* (2013.01); *B60R 22/26* (2013.01);
(Continued)

(58) Field of Classification Search
CPC ......... B60R 22/03; B60R 22/20; B60R 22/26; B60R 22/48; B60R 21/207; B60R 2022/208; B60R 2022/1818
(Continued)

(56) References Cited

U.S. PATENT DOCUMENTS 6,474,691 B2 *  11/2002  Izume .................... B60R 22/20
                                                280/801.1
7,226,131 B2 *   6/2007  Meneses ................ B60R 22/26
                                                297/452.18
(Continued)

FOREIGN PATENT DOCUMENTS

JP    03-121166 U    12/1991
JP    07-030165 U     6/1995
(Continued)

OTHER PUBLICATIONS

Honda Motor Co., Ltd., "Honda Civic Ferio (2005 Nen 8 Gatsu Model)," Honda Motor Co., Ltd., Mar. 30, 2010, retrieved from internet website: <http://www.honda.co.jp/auto-archive/civic/4door/2005/interior/> on Nov. 14, 2014, with machine generated English language translation, 4 pages.

*Primary Examiner* — Milton Nelson, Jr.
(74) *Attorney, Agent, or Firm* — Drinker Biddle & Reath LLP

(57) ABSTRACT

Provided are a seat belt assist device and a vehicular seat such that a seat belt can be moved to a position easily accessible by a seated person in a compact and simple configuration. A seat belt assist device is configured to move at least a part of a seat belt of a seat for a vehicle to a position easily accessible by a seated person, and is provided with a movable member that supports a part of the seat belt and that moves between a normal position and a protruded position that protrudes beyond the normal position. The movable member is disposed on an upper surface of a seat back of the (Continued)

seat, with an end portion thereof at the door side of the vehicle being disposed toward an end of the upper surface of the seat back in a right and left direction, and with a forward end disposed rearward of a front end surface of the upper surface of the seat back.

18 Claims, 17 Drawing Sheets

(51) Int. Cl.
*B60R 21/207* (2006.01)
*B60R 22/20* (2006.01)
*B60R 22/26* (2006.01)
*B60R 22/18* (2006.01)

(52) U.S. Cl.
CPC ...... *B60R 22/48* (2013.01); *B60R 2022/1818* (2013.01); *B60R 2022/208* (2013.01)

(58) Field of Classification Search
USPC ......................................................... 297/483
See application file for complete search history.

(56) References Cited

U.S. PATENT DOCUMENTS

| | | | |
|---|---|---|---|
| 8,303,042 B2* | 11/2012 | Kujawa | B60N 2/688 297/473 |
| 2007/0040058 A1 | 2/2007 | Koide | |
| 2012/0175936 A1 | 7/2012 | Miyagawa et al. | |

FOREIGN PATENT DOCUMENTS

| | | |
|---|---|---|
| JP | 07-165014 A | 6/1995 |
| JP | 11-342831 A | 12/1999 |
| JP | 2004-136769 A | 5/2004 |
| JP | 2005-212605 A | 8/2005 |
| JP | 2007-055307 A | 3/2007 |
| JP | 2007-083942 | 4/2007 |
| JP | 2010-167939 A | 8/2010 |
| JP | 2012-144078 A | 8/2012 |

\* cited by examiner

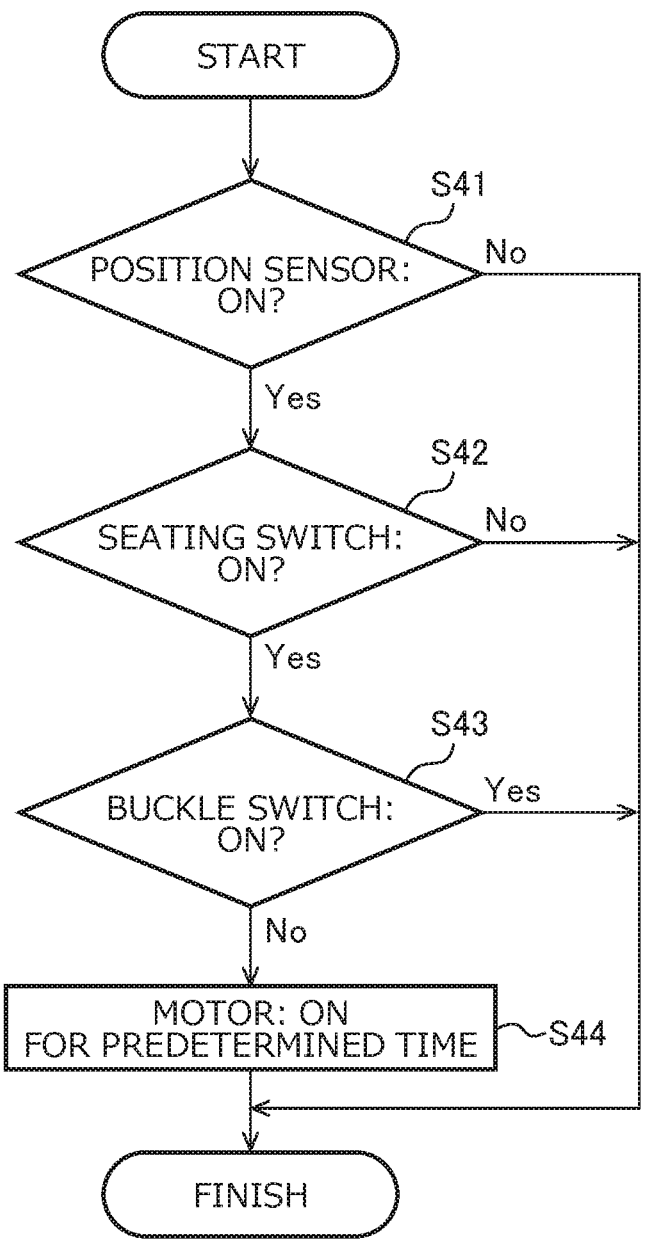

SEAT BELT ASSIST DEVICE, AND VEHICULAR SEAT

CROSS-REFERENCE TO RELATED APPLICATIONS

This application is a National Stage Entry application of PCT Application No. PCT/JP2014/073877, filed Sep. 10, 2014, which claims the priority benefit of Japanese Patent Application No. 2013-200404, filed on Sep. 26, 2013, the contents being incorporated herein by reference.

BACKGROUND

The present disclosure relates to a seat belt assist device and a vehicular seat where a seat belt is moved to a position easily accessible by a hand of a seated person, when the seated person is seated.

Examples of vehicular seats that rotate a belt movable part forward, to move a seat belt forward, for a seated person of the vehicular seat to easily take the seat belt, have been publicly known, for example, as described in Japanese Utility Model Publication No. H07-030165 ("the '165 publication"). A webbing device assist device of the '165 publication is used in a three-point seat belt device in which a continuous webbing is used, and assists a wearing operation when a seated person wears the webbing. In the webbing of the '165 publication, one of the longitudinal end portions is wound in a winding device, a longitudinal middle portion is hung on a through anchor, which is swingably disposed in an upper portion of a center pillar of a vehicle, and the other longitudinal end portion is locked with a fixing anchor, which is fixed to a floor portion of a vehicle body. In addition, a guide arm is installed in the side portion behind the seat of the vehicle, and the guide arm is provided with an engagement part capable of pressing the webbing, with the other end of the engagement part being rotatably supported on the vehicle side. The engagement part is contacted with and detached from the webbing by a rotation of the guide arm.

According to the '165 publication, when the guide arm rotates toward the forward side of a vehicle, the engagement part is engaged with and presses the middle portion of the webbing, and the middle portion of the webbing is disposed in the vicinity of an arm of a seated person. Then, a length of the guide arm is elongated with the rotation to bring the middle portion of the webbing more closely to the arm of the seated person, so that the seated person can easily hold the webbing.

However, since the '165 publication has a mechanism such that the rotation of the guide arm makes the engagement part move the middle portion of the webbing forward, the webbing device assist device is relatively large in size to provide a movable amount of the guide arm.

SUMMARY

In view of the above described problems, the present disclosure describes various embodiments of a seat belt assist device and a vehicular seat configured to move a seat belt to a position where the seat belt is easily taken by a seated person, by a compact and simple configuration.

According to an embodiment of a seat belt assist device of the present disclosure, a seat belt assist device which is configured to move at least a part of a seat belt of a vehicular seat to a position easily accessible by a seated person; the seat belt assist device being provided with a movable member that supports a part of the seat belt and moves between a normal position and a protruded position that protrudes beyond the normal position; the movable member being provided on an upper face of a seat back of the seat, with an end portion thereof at a door side of the vehicle disposed on an end portion of the seat back in the right and left direction of the upper face of the seat back, and a forward end portion thereof being disposed on the upper face of the seat back behind a forward end face. In this embodiment, the movable member is inhibited from becoming large in size and a more compact seat belt assist device is implemented.

In some embodiments, it is preferred that the protruded position is a position protruded upward beyond the normal position. By such a configuration, the movable distance of the movable member in the up and down direction is secured, which controls the movable distance in the front to back direction of the movable member to inhibit the narrowing of a space inside a vehicle as compared to when the movable member protrudes forward.

In an embodiment, it is preferred that the protruded position is below an upper end face of a headrest of the seat. In this embodiment, a movable area of the movable member is made to be more compact, while making the movable member sufficient to move a seat belt to a position where the seat belt is easily held by a seated person.

In an embodiment, it is preferred that the protruded position is in a position protruded forward beyond the normal position, and the protruded position is behind the forward end face of the headrest of the seat. In this embodiment, a movable area of the movable member is made to be more compact, while making the movable member sufficient to move a seat belt to a position where the seat belt is easily held by a seated person.

In an embodiment, it is preferred that the device is provided with a control section that moves the movable member between a normal position and a protruded position on the basis of one or more signals, and that the control section moves the movable member to the protruded position on the basis of a seating detection signal from a seated person detector which detects that a seated person has been seated on the seat. In this embodiment, the movable member is moved to the protruded position after an occupant is seated, to timely provide assistance in wearing the seat belt.

In an embodiment, it is preferred that the device is provided with a control section that moves the movable member between a normal position and a protruded position on the basis of a signal from outside, and that the control section moves the movable member to the protruded position on the basis of a vehicle driving detection signal which shows that a speed of the vehicle is a predetermined speed or higher from a vehicular speed detector for detecting a vehicular speed of the vehicle. In this embodiment, a user's failure to fasten a seat belt after a starting of a vehicle is reduced.

In an embodiment, it is preferred that the device is provided with a control section that moves the movable member between a normal position and a protruded position on a basis of one or more signals, and that the control section moves the movable member to the normal position on the basis of a belt fastening detection signal from a belt fastening detector for detecting that the seat belt has been fastened. In this embodiment, while the seat belt is fastened, the movable member is back at the normal position to be able to inhibit a foreign object from entering the system for moving the movable member.

In an embodiment, it is preferred that the movable member includes: a supporting part that supports the seat belt slidably in the longitudinal direction of the seat belt; and a sliding part provided integrally with the supporting part, with the sliding part being provided on an upper face of the seat back, and slidably inserted into a sliding hole of the seat back which is provided with an opening on an upper portion of the seat back. In this embodiment, the movement of the movable member is achieved by a sliding movement along the sliding hole of the sliding part of the movable member, and the seat belt assist device is implemented with a simple configuration.

In an embodiment, it is preferred that the sliding part is provided in a pair, and that the pair of sliding parts is arranged in line along the right and left direction of the seat, with a predetermined distance therebetween. In this embodiment, the movable member is disposed along the right and left direction of the seat, to be inhibited from stretching out forward in a vehicle interior, and to be compactly configured in the front to back direction of the seat.

In an embodiment, it is preferred that the pair of sliding parts is arranged in line along the direction in which the pair of headrest pillars provided on the seat back is arranged in line. In this embodiment, the movable member is disposed along the right and left direction of the seat, to be inhibited from stretching out forward in a vehicle interior, and to be compactly configured in the front to back direction of the seat.

In an embodiment, it is preferred that device is provided with a control section that moves the movable member between the normal position and the protruded position on a basis of one or more signals, and that the supporting part is provided with a pinching detector on a face of the supporting part which faces the seat back, and that the control section stops movement control toward the normal position when a load at the pinching detector exceeds a predetermined threshold value. In this embodiment, the system is inhibited from moving the movable member and being damaged due to a pinching of a foreign object.

In an embodiment, it is preferred that the vehicular seat is one provided with a seat back for supporting the back of a seated person, a seat belt, and the seat belt assist device of the present disclosure. In this embodiment, the movable member is inhibited from becoming large in size, and a vehicular seat provided with a compact seat belt assist device is implemented.

In an embodiment, it is preferred that the vehicular seat is one provided with a seat back for supporting the back of a seated person, a seat belt, and the seat belt assist device of the present disclosure, and that inside the seat back is provided with the sliding hole formed therein, having the opening on an upper end face of the seat back. Since the sliding hole is thus formed inside a seat back, a vehicular seat with a reduced influence on an appearance and a compact seat belt assist device is implemented.

In an embodiment, it is preferred that the seat back is provided with a frame part for supporting the seat back, and an air bag module is fixed to the frame part, and the sliding part is disposed behind the air bag module in the seat orientation. In this embodiment, a passageway is provided for the air bag to expand toward the forward direction of the seat.

In an embodiment, it is preferred that it is formed with a rear seat disposed rearward in the vehicle, and that an accommodation recess part for a center armrest and the center armrest that is configured to be accommodated in the accommodation recess part are provided in a center of the rear seat in the right and left direction of the rear seat, and further that the sliding part is disposed in a position where at least a part thereof overlaps with the center armrest in the right and left direction of the seat. In this embodiment, the seat belt assist device is inhibited from stretching out forward and upward from the seat, to provide a reduced size in the front to back direction.

It is preferred that, when the movable member is in the normal position, the seat belt is in contact with a forward face of the seat back, in the seat orientation, through the upper portion to the lower portion of the seat back, and when the movable member is in the protruded position, a gap is formed between the seat belt and the forward face of the seat back, in the seat orientation. In this embodiment, a gap is formed between the seat belt and the seat back when the movable member is in the protruded position, allowing a seated person to easily hold the seat belt.

According to an embodiment of the present disclosure, the movable member is inhibited from becoming large in size and a compact seat belt assist device is provided. In addition, since a movement distance of the movable member is secured in the up and down direction, the movement distance in the front to back direction of the movable member is controlled to inhibit a vehicle interior from being narrowed compared to a case where the movable member protrudes forward.

In various embodiments, the movable area of the movable member is made to be compact, by making the movable member sufficient to move a seat belt to a position where the seat belt is easily held by a seated person. The movable member is moved to the protruded position after an occupant is seated, to timely provide assistance in wearing a seat belt. A user's failure to fasten a seat belt after a starting of a vehicle is reduced.

While the seat belt is fastened, the movable member is back at the normal position, to be able to inhibit a foreign object from entering the system for moving the movable member. The movement of the movable member is achieved by the sliding movement along the sliding hole of the sliding part of the movable member, and the seat belt assist device is implemented with a more simple configuration.

In an embodiment, the movable member is disposed along the right and left direction of the seat, to be inhibited from stretching out forward in a vehicle interior, and to be compactly configured in the front to back direction of the seat. The system is inhibited from moving the movable member and being damaged due to a pinching of a foreign object.

In an embodiment, the movable member is inhibited from becoming large in size, to implement a vehicular seat provided with a compact seat belt assist device. Since the sliding hole is formed inside a seat back, a vehicular seat is configured with a reduced influence on its appearance, and with a compact seat belt assist device.

In an embodiment, a secure a passageway is provided for an air bag to expand toward the forward direction of the seat. The seat belt assist device is inhibited from stretching out forward and upward from the seat, to a reduced size in the front to back direction is provided. A gap is formed between a seat belt and a seat back when the movable member is in the protruded position, allowing a seated person to easily hold the seat belt.

BRIEF DESCRIPTION OF DRAWINGS

FIG. 17 is a flow diagram showing a method for control of the assist device according to the third embodiment of the present disclosure.

DETAILED DESCRIPTION

Figure 1:
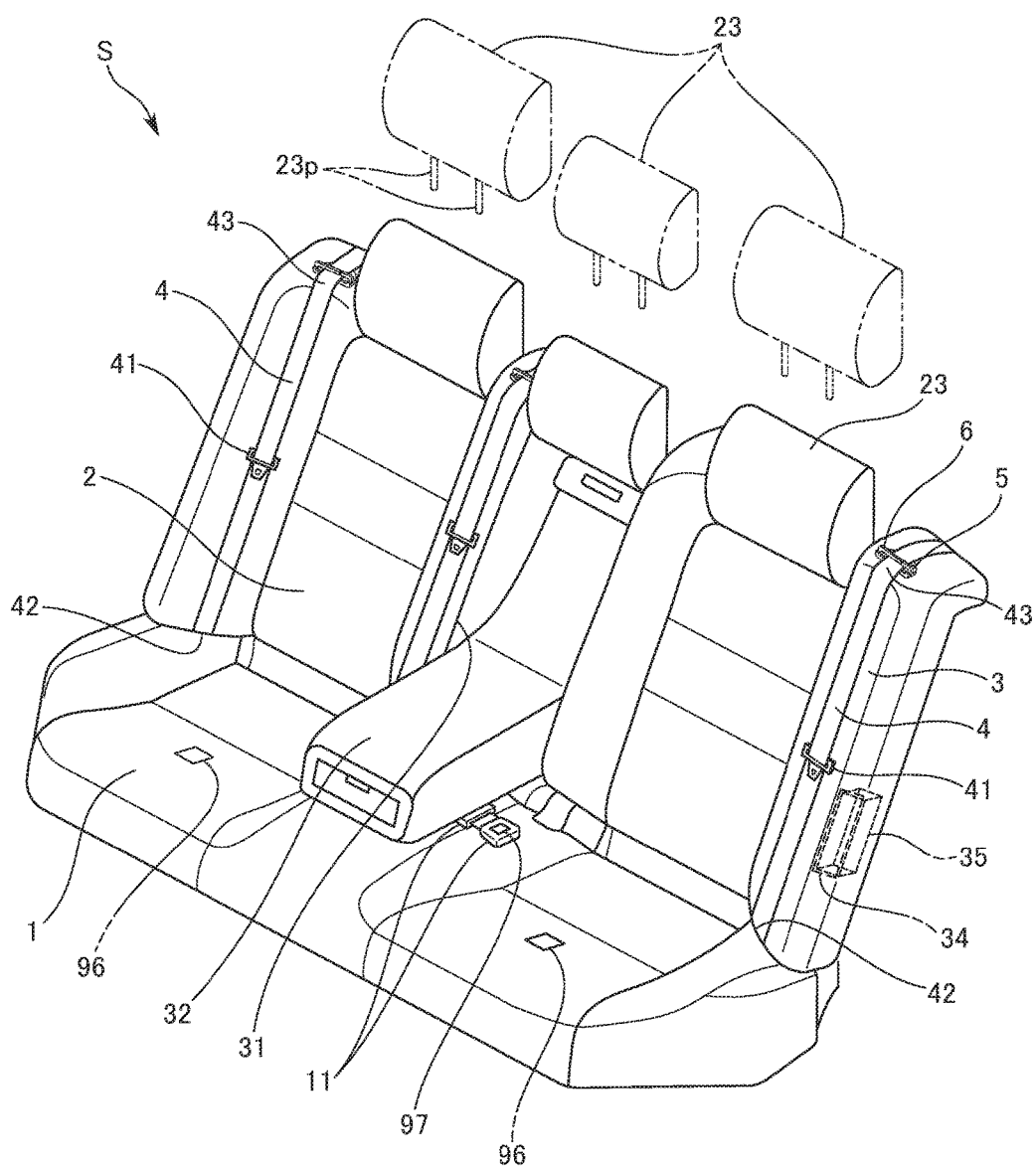
FIG. 1 is a perspective, partial schematic view of a rear seat according to first, second, and third embodiments of the present disclosure.

Hereinafter, a seat belt assist device and a vehicular seat according to various embodiments of the present disclosure are described with reference to FIGS. 1 to 17.
First Embodiment A vehicular rear seat (synonymous with a back seat, hereinafter simply referred to as seat) S according to the present embodiment is a rear seat for three occupants and includes a seat cushion 1, which functions as a seating portion, and a seat back 2, which functions as a backrest, as shown in FIG. 1. The seat cushion 1 is configured so that a buffer member, such as a cushion pad, is placed on a frame (not illustrated) formed of a relatively hard synthetic resin material, and the buffer member is wrapped by a covering. The seat back 2 is configured so that a base member to which a buffer member (not illustrated) made of a cushion material and a covering material (not illustrated) are adhered and fixed, is placed on a frame (not illustrated) formed of a relatively hard synthetic resin material. The seat S is installed so that the frames (not illustrated) of the seat cushion 1 and the seat back 2 face a metal sheet portion (not illustrated) which is part of a body of a vehicle.

The ends of the seat S in a width direction of the seat S each include a rear back side part 3 which supports a seated person who is seated on a window side of the seat S by a side portion of the upper body in the outer side in the width direction of the vehicle. A position lower than the center in the up and down direction in an outer side of the rear back side part 3 is provided with a separable part 34 formed by sewing a covering material into a rectangular shape. In the frame (not illustrated), a position behind the separable part 34 in the seat orientation has an opening (not illustrated) into which an air bag module 35 is fixed at the position shown in FIG. 1.

The seat back 2 comprises a backrest portion of the seat S, and includes panels in series in the width direction of the vehicle. A recess part 31 which is elongated in an up and down direction of the seat S is formed in a center portion of the seat in the width direction of the seat, and the recess part 31 is provided with an armrest 32 which is configured to be accommodated in the recess part 31. In addition, an upper end of the seat back 2 is provided with headrests 23 in three positions which are spaced from each other with a predetermined distance therebetween in the seat width direction. Each headrest 23 is provided with a pair of headrest pillars 23p which protrude downward from a lower end face of the headrest, as shown in FIG. 1. The headrest pillars 23p are formed with a rod-shaped body made of metal. Positions corresponding to the headrest pillars 23p on an upper end face of the seat back 2 are provided with tubular supporting guides (not illustrated) which are configured to house the headrest pillars 23p inside. The headrest pillars 23p are removably installed on the upper end face of the seat back 2 by individually inserting the headrest pillar 23p into the supporting guide (not illustrated).

The seat back 2 is provided with seat belts 4 in the vicinities of the both ends in the seat width direction, each along the forward face of the rear back side parts 3. Another seat belt 4 is provided in the right side of the recess part 31 as viewed from a seated person, and thus, three seat belts 4 are provided in total. Each of the seat belts 4 is a three-point seat belt, on which a tongue plate 41 is installed. The seat cushion 1 is provided with three buckles 11, to each of which the tongue plate 41 is configured to be fitted. In each of the seat belts 4, a lower end side 42 is drawn in between the rear end of the seat cushion 1 and the lower end of the seat back 2, and fixed at a position (not illustrated) behind the seat S of the main vehicle body. On the other hand, an upper end side 43 is slidably inserted into a belt guide 5 provided on the upper end face of the seat back 2, and then drawn down from the rear portion of the upper end of the seat back 2 to rearward of the back face of the seat S, and the end portion thereof is fixed to an automatic winding device (not illustrated).

Figure 2:
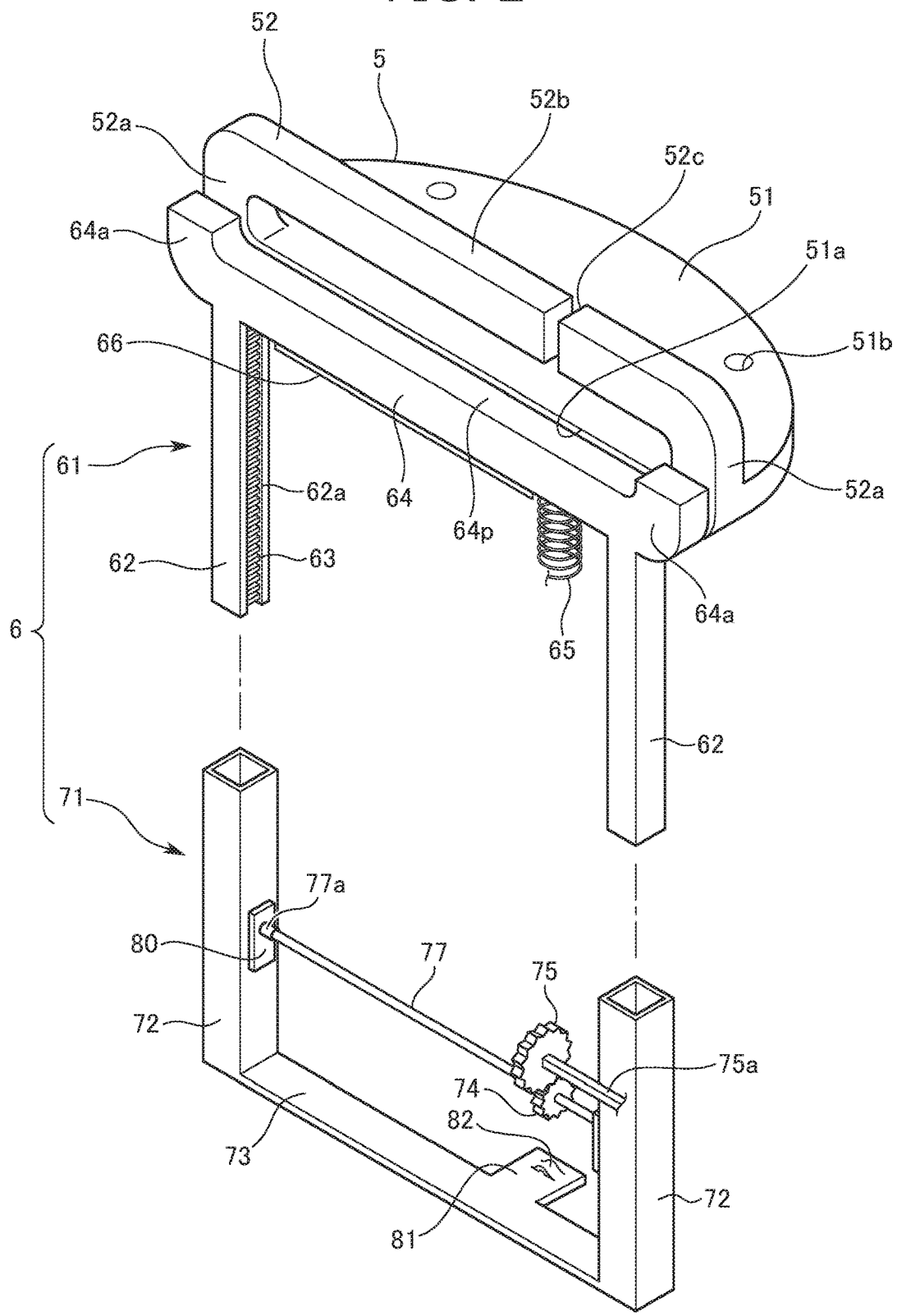
FIG. 2 is a perspective view of an assist device and a belt guide according to the first embodiment of the present disclosure.

The belt guide 5, made of a hard resin, is formed by integrally molding: a board part 51 which forms a plane along the upper end face of the seat back 2 at a time of fixing; and a guiding part 52 provided on one of the ends of the board part 51, as shown in FIG. 2. The board part 51 is formed with a substantially semi-elliptical plate having a shape of ellipse cut along a straight line in plan view, and an end portion 51a thereof which is linear in plan view is provided with the guiding part 52, as shown in FIG. 2. The guiding part 52 is provided with: a pair of leg parts 52a perpendicularly standing upward from the both ends of the end portion 51a; and an upper holding part 52b which is formed so that the upper ends of the pair of leg parts 52a extend each curving perpendicularly towards the other leg part 52a. The upper holding part 52b is formed with a substantially rod-shaped body, and has a space 52c between a tip of the portion extended from one of the leg parts 52a and a tip of the portion extended from the other leg part 52a, which is configured for insertion of the seat belt 4, and is used to insert the seat belt 4 into the guiding part 52. In addition, a bolt hole 51b is formed on the board part 51 as shown in FIG. 2, and used to bolt the board part 51 onto the upper end face of the seat back 2.

An assist device 6 as a seat belt assist device is provided ahead of the belt guide 5 in the seat orientation, as shown in FIG. 1 and FIG. 2. The assist device 6 includes: a substrate base 71 which is installed inside the seat back 2, the substrate base 71 being fixed to a frame (not illustrated) of the seat back 2; and a belt support 61 as a movable member which moves up and down on the seat back 2, the belt support 61 being supported by the substrate base 71, as shown in FIG. 2. The substrate base 71 is provided with guiding leg parts 72 as a pair of sliding holes which is installed, the pair of sliding holes being spaced from each other with a distance slightly wider than a width of the seat belt 4; a linking plate part 73 which links the lower ends of the guiding leg parts 72; a motor 91; gears 74, 75 with a rotation synchronizing shaft 77 for transmitting the rotational movement of the motor 91; a worm gear 78 linked to the rotation synchronizing shaft 77; and a worm wheel 79 which meshes with the worm gear 78 and meshes, at the same time, with a rack 63 of the belt support 61.

A guiding leg part 72 is formed with a hollow square tubular body made of metal, and has a rectangular opening (not illustrated) which is opened on a face facing the other guiding leg member 72, and covered with a cover 80, as shown in FIG. 2. Between the openings (not illustrated) of the pair of guiding leg parts 72, the rotation synchronizing shaft 77 is installed to bridge the guiding leg parts 72. Both end sides of the rotation synchronizing shaft 77 are held on the inner side faces of the right and left guiding leg parts 72, with shaft bearings 77a provided on covers 80. Between the right and left guiding leg parts 72, the rotation synchronizing shaft 77 is provided with a gear 74, the axis thereof being the rotation synchronizing shaft 77, and a gear 75 that meshes with the gear 74. A shaft 75a of the gear 75 is connected to an outputting shaft of the motor 91 through a clutch 93 which is formed with an electromagnetic clutch.

Figure 3:
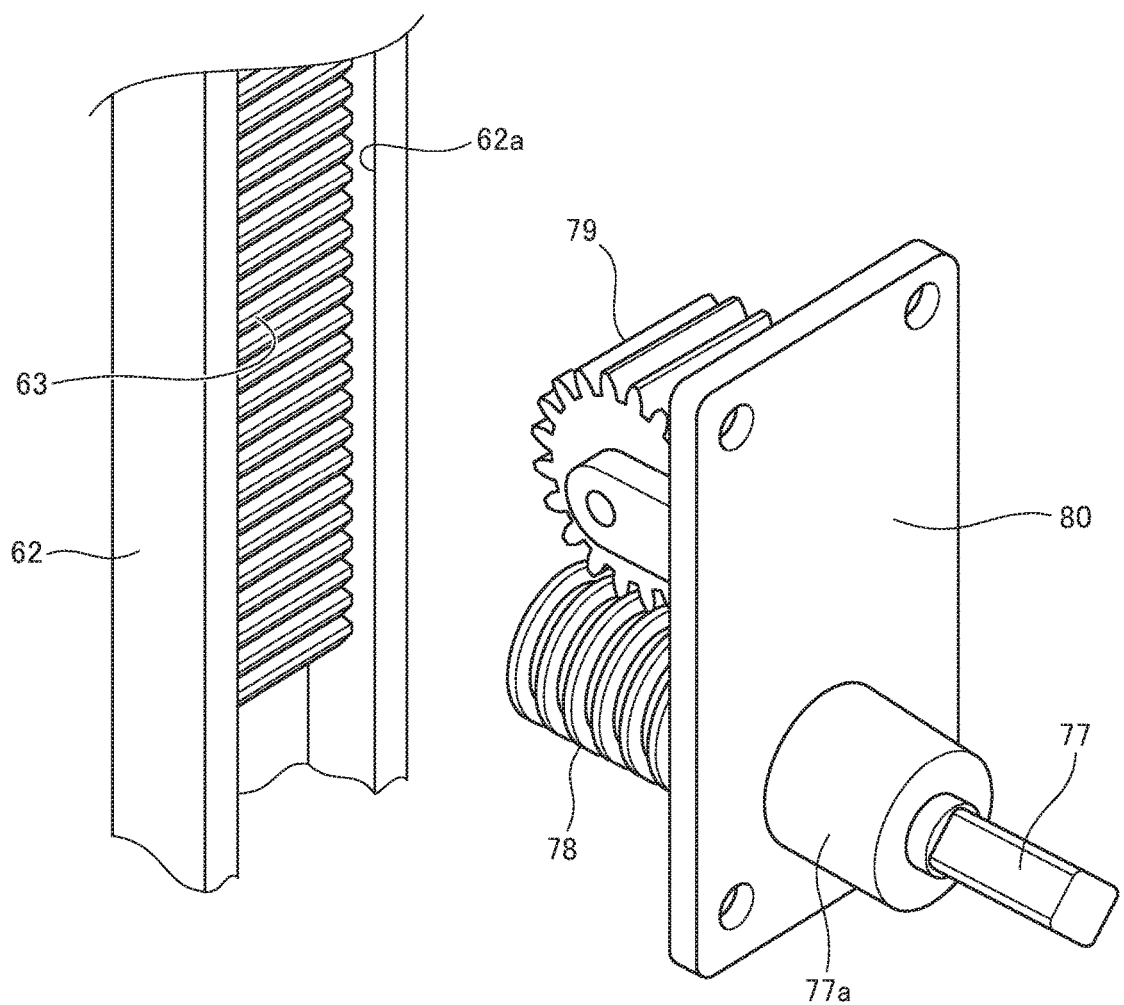
FIG. 3 is a perspective, exploded view showing a structure of a worm wheel and a rack for converting a rotational movement in a motor shaft side into an up and down movement of a belt support.

Both end portions of the rotation synchronizing shaft 77 are disposed in regions surrounded by wall faces of the guiding leg parts 72 and the covers 80, and the worm gear 78 is provided coaxially, as shown in FIG. 3. A face of the cover 80 which is in the inner side of the guiding leg part 72 is provided with the worm wheel 79 which meshes with the worm gear 78 and the rack 63 of the belt support 61 as shown in FIG. 3, making a configuration that converts a rotating movement of the rotation synchronizing shaft 77 into an up and down movement of the right and left belt supports 61. The linking plate part 73 is provided with a protruded part 81 which protrudes in a direction perpendicular to the longitudinal direction of the linking plate part 73, and on a face of the protruded part 81, in the side of the guiding leg part 72, a locking part 82 for locking a spring provided to the belt support 61 is formed.

The belt support 61 is formed with a substantially H-shaped body made of hard resin, and provided with sliding leg parts 62 as a pair of sliding parts, and a belt supporting part 64 which links end portions in the upper end sides of the right and left sliding leg parts 62. The sliding leg part 62 has a groove 62a, formed on a face on the inner side thereof facing the other sliding leg part 62, which extends in the longitudinal direction and has a rectangular section. The rack 63 which extends in the longitudinal direction of the sliding leg part 62 is fixed to the groove 62a. The belt supporting part 64 is formed with a substantially rod-shaped body having a rectangular section, and equipped with a pair of wall parts 64a which curvedly protrudes upward, in both ends in the longitudinal direction.

The sliding leg parts 62, which extend to the opposite side of the direction in which the wall parts 64a protrude, is formed on two positions which are disposed slightly inward of the pair of wall parts 64a. A face of the belt supporting part 64 in the side to which the wall part 64a protrudes, which is a portion sandwiched by the pair of wall parts 64a, is a plane perpendicular to the extending direction of the wall part 64a and the sliding leg part 62, and forms a supporting face 64p which slidably supports the seat belt 4. A face in the opposite side of the supporting face 64p, which is a position sandwiched by the pair of sliding leg parts 62, has fixed thereto: a spring 65 for biasing the belt support 61 toward the substrate base 71 side; and a pinching sensor 66 for detecting a pinching between the belt support 61 and the upper end face of the seat back 2, that is formed with a publicly known pressure-sensitive sensor. The sliding leg part 62 and the belt supporting part 64 are configured into a flat board shape, such that the forward face thereof in the seat orientation and the back face thereof in the seat orientation each form a plane perpendicular to the supporting face 64p. The assist device 6 is installed in the vicinity of the upper end of the frame (not illustrated) of the seat back 2, such that the back faces of the sliding leg part 62 and of the belt supporting part 64 in the seat orientation are in parallel with, and opposed to the forward face of the guiding part 52 of the belt guide 5 in the seat orientation, as shown in FIG. 1 and FIG. 2. As shown in FIG. 1, the belt supporting part 64 of the belt support 61 has: an end portion at the door side of the vehicle disposed on or closely to an end portion of the seat back 2 in the right and left direction of the seat back 2; and a forward end portion disposed behind the forward end face of upper face of the seat back 2.

The guiding leg parts 72 are arranged in line in the right and left direction of the seat, with being spaced by a predetermined distance. The headrest pillars 23p are also are arranged in line in the right and left direction of the seat with being spaced by a predetermined distance. The guiding leg parts 72 and the headrest pillars 23p are arranged in line, along the same direction. The guiding leg parts 72 are installed inside the seat back 2, to vertically extend, with the openings in the upper ends thereof being disposed on the upper end face of the seat back 2. Accordingly, the sliding leg part 62 slides in the vertical direction, which allows the belt support 61 to move in the up and down direction. Further, in an embodiment, the guiding leg parts 72 are arranged in an inclined manner, such that the opening side is disposed in an upper forward position, and the linking plate part 73 is disposed in a lower rear position. In that case, the belt support 61 protrudes toward an upper forward direction from the upper end portion of the seat back 2. An inner wall of the guiding leg part is provided with a position sensor 99 at a position (not illustrated) slightly below the lower end position of the sliding leg part 62 when the belt support 61 has reached the highest position. The position sensor 99 is formed with a contact-type touch switch (not illustrated). The position sensor 99 detects a contact state when the lower end of the sliding leg part 62 is positioned below the position sensor 99, and detects a non-contact when the lower end of the sliding leg part 62 is positioned above the position sensor 99 to detect that the belt support 61 is in the highest position. The guiding leg part 72 is disposed such that at least a part thereof is arranged in line with the recess part 31 of the armrest 32 in the right and left direction of the seat. At this time, the entire assist device 6 is disposed behind the air bag module 35 in the seat orientation.

Figure 4:
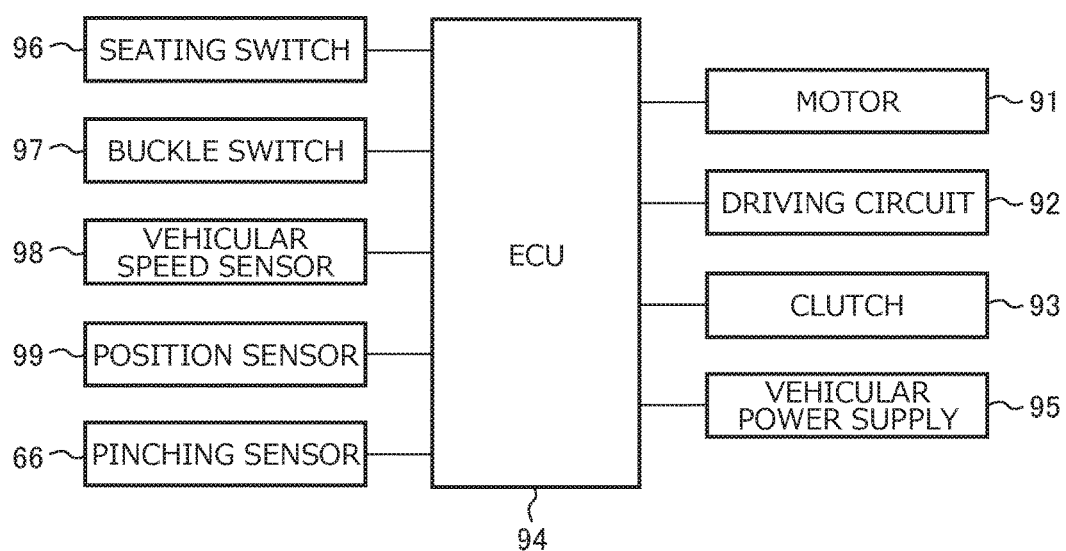
FIG. 4 is a block diagram showing an electrical structure of the assist device according to the first embodiment of the present disclosure.

The assist device 6 is provided with a driving circuit 92 for supplying a driving power to the motor 91, and an ECU (electronic control circuit) 94 as a control section, as shown in FIG. 4. The motor 91 is connected to a vehicular power supply 95 through the driving circuit 92. Thus, the ECU 94 controls a functioning of the motor 91, in other words, the up and down movement of the belt support 61, by controlling the driving power to be supplied from the driving circuit 92 to the motor 91, and by controlling an on/off status of an electric current of the clutch 93 which is formed with an electromagnetic clutch.

ECU 94 is connected to a seating switch 96 which is installed in the seat cushion 1 as a seated person detector for detecting a seating of a seated person, a buckle switch 97 which is installed in the buckle 11 as a belt fastening detector for detecting that the tongue plate 41 is linked with the buckle 11, a vehicular speed sensor 98 as a vehicular speed detector for detecting a vehicular speed of a vehicle, the position sensor 99 for detecting that the belt support 61 is in the highest position, and the pinching sensor 66 as a pinching detector. The vehicular speed sensor 98 is set to be turned on when a vehicular speed of a vehicle reaches a predetermined speed, for example, 20 km/hour. The ECU 94 controls a functioning of the belt support 61, on the basis of a signal which is input from each of these sensors.

Figure 5:
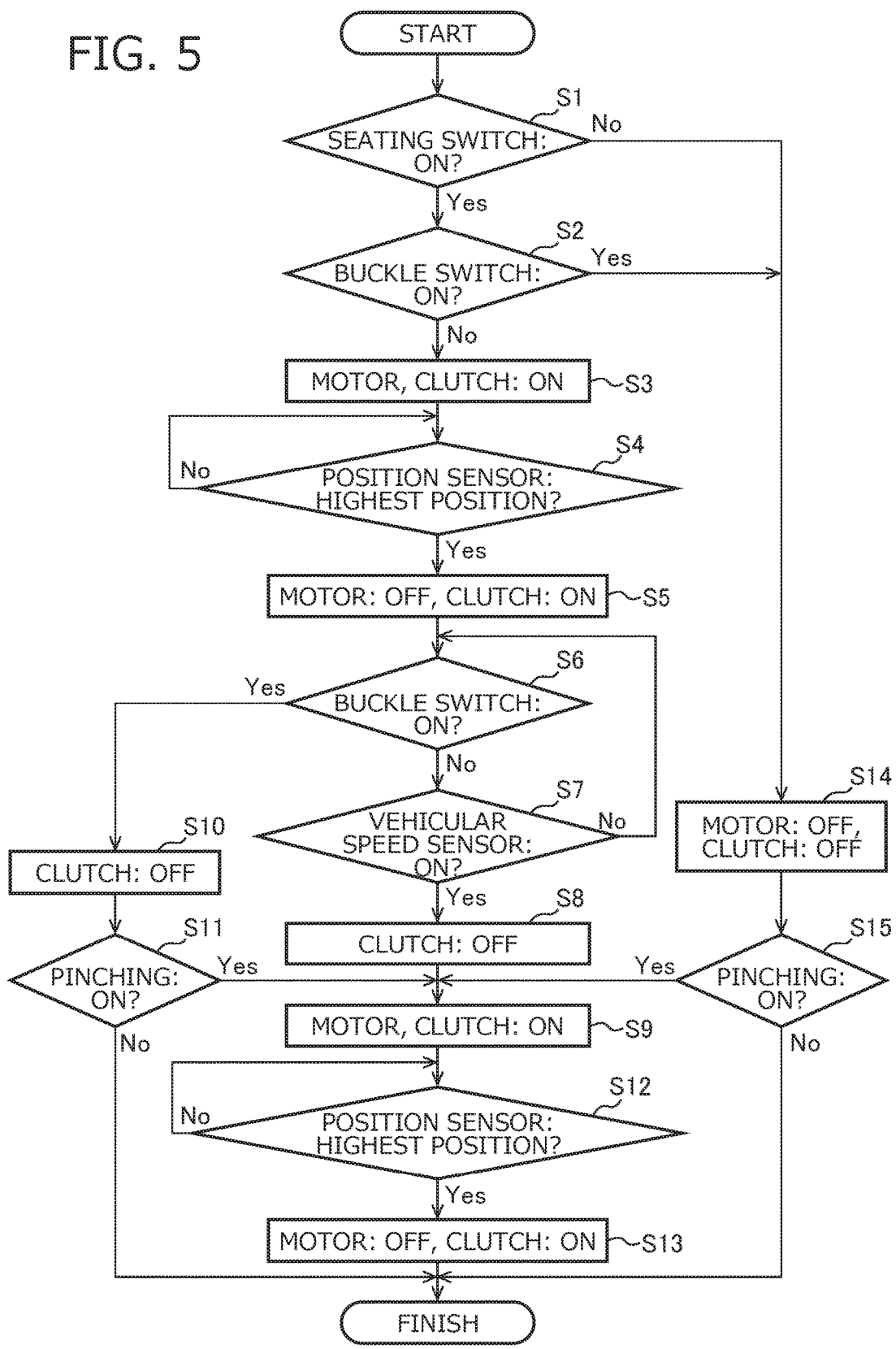
FIG. 5 is a flow diagram showing a method for control of the assist device according to the first embodiment of the present disclosure.
Figure 6:
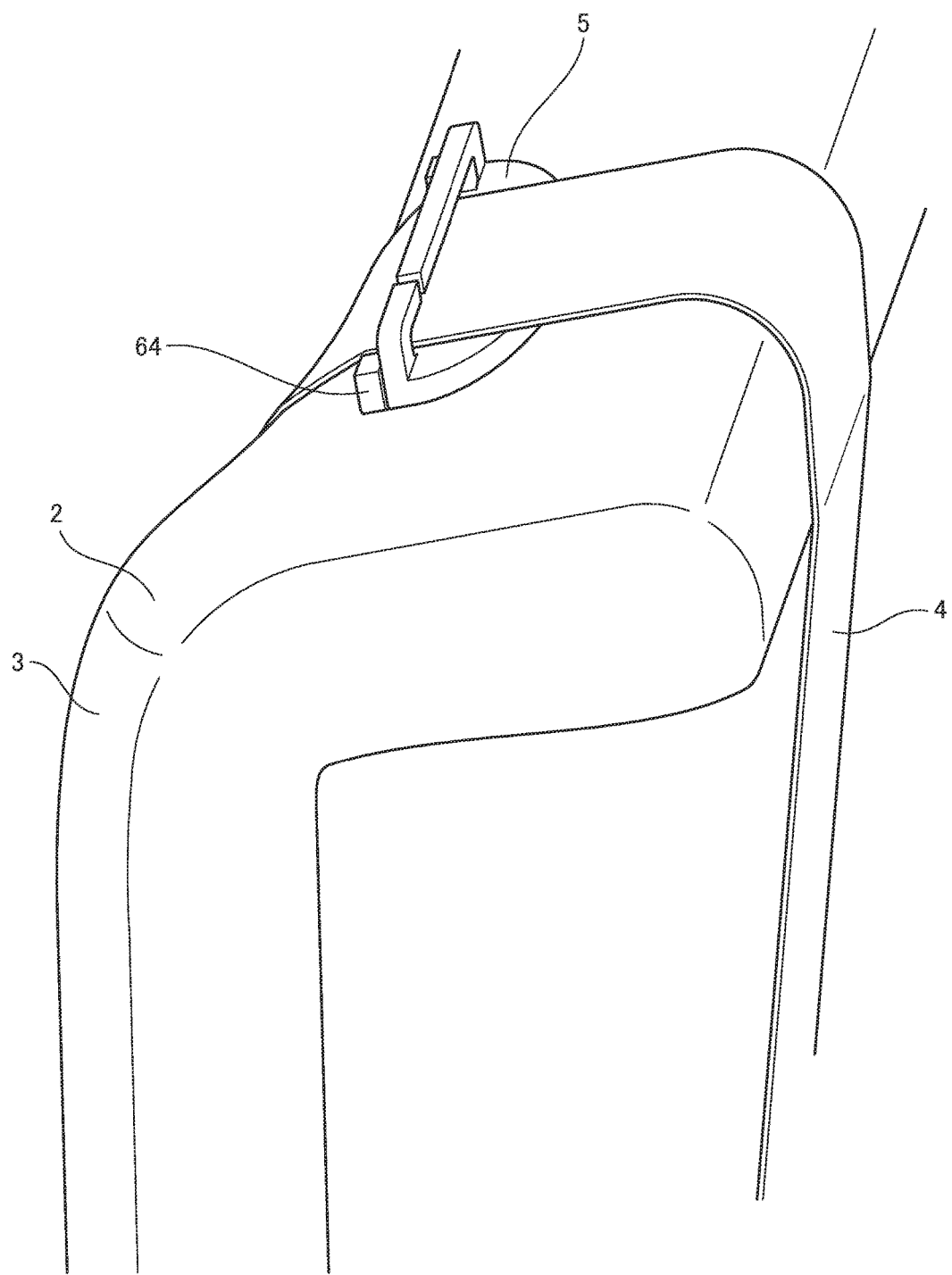
FIG. 6 is a perspective view showing a state where a belt supporting part of the assist device according to the first embodiment of the present disclosure is in a normal position.

Operation of the assist device 6 of the present embodiment is now described by using the flowchart of FIG. 5. Processing of FIG. 5 is controlled by the ECU 94 and is repeatedly performed during a time when an ignition switch of the vehicle is on. In a normal time, the assist device 6 is in the normal position as shown in FIG. 6, which is a state where only the belt supporting part 64 is protruded and exposed outside the seat back 2. At this time, the seat belt 4 is substantially in close contact with a surface of the seat back 2.

When the processing of the flowchart of FIG. 5 is started, firstly, at Step S1 it is determined whether the seating switch 96 is on. When the seating switch 96 is not on (Step S1: No), it is determined that no person is seated on the seat S, and accordingly the belt support 61 should be in the lowered position, on the basis of which at Step S14 an OFF signal is transmitted to the driving circuit 92, and an OFF signal is transmitted to the clutch 93 to stop the supply of the driving power from the driving circuit 92 to the motor 91, and to turn off the electric current of the clutch 93. Subsequently, at Step S15 it is determined whether the pinching sensor 66 has detected a pinching. When the pinching sensor 66 does not detect a pinching (Step S15: No), it is determined that there is no pinching between the belt support 61 and the upper end face of the seat back 2, and a lowering and a housing into the substrate base 71 of the belt support 61 have been completed without problem, on the basis of which the processing is finished. When the pinching sensor 66 detects a pinching (Step S15: Yes), at Step S9 an ON signal is transmitted to the driving circuit 92 and the clutch 93 to supply the driving power from the driving circuit 92 to the motor 91, and to turn on the electric current of the clutch 93 to raise the belt support 61 again. When the seating switch 96 is on (Step S1: Yes), it is determined that a seated person is seated on the seat S, on the basis of which at Step S2 it is determined whether the buckle switch 97 in the position corresponding to the seating switch 96 which is on has been turned on.

When the buckle switch 97 is on (Step S2: Yes), it is determined that a seated person who is seated on the seat S has fastened the seat belt 4, and accordingly the belt support 61 should be in the lowered position, on the basis of which at Step S14 an OFF signal is transmitted to the driving circuit 92, and an OFF signal is transmitted to the clutch 93 to stop the supply of the driving power from the driving circuit 92 to the motor 91, and to turn off the electric current of the clutch 93. Subsequently, at Step S15 it is determined whether the pinching sensor 66 has detected a pinching. When the pinching sensor does not detect a pinching 66 (Step S15: No), it is determined that there is no pinching between the belt support 61 and the upper end face of the seat back 2, and a lowering and a housing into the substrate base 71 of the belt support 61 have been completed without problem, on the basis of which the processing is finished. When the pinching sensor 66 detects a pinching (Step S15: Yes), at Step S9 an ON signal is transmitted to the driving circuit 92 and the clutch 93 to supply the driving power from the driving circuit 92 to the motor 91, and to turn on the electric current of the clutch 93 to raise the belt support 61 again.

When the buckle switch 97 is not on (Step S2: No), it is determined that a seated person has been seated but has not yet fastened the seat belt 4, on the basis of which at Step S3 an ON signal is transmitted to the driving circuit 92 and the clutch 93 to supply the driving power from the driving circuit 92 to the motor 91, and to turn on the electric current of the clutch 93. This makes the motor 91 rotate, and this rotational movement is transmitted to the worm wheel 79 through the clutch 93 which has been set into an operation state by the supply of the electric current and through the rotation synchronizing shaft 77. Then, the rack 63 that is meshed with the worm wheel 79 is moved upward, and the belt support 61 starts rising.

Subsequently, at Step S4 it is determined whether the position sensor 99 has detected that the belt support 61 has reached the highest position. When the position sensor 99 does not detect that the belt support 61 has reached the highest position (Step S4: No), the process returns to Step S4, and it is determined whether the position sensor 99 has detected that the belt support 61 has reached the highest position. When the position sensor 99 detects that the belt support 61 has reached the highest position (Step S4: Yes), it is determined that the belt support 61 has risen to a necessary height, on the basis of which Step S5 an OFF signal is transmitted to the driving circuit 92 and an ON signal to the clutch 93 to stop the supply of the driving power from the driving circuit 92 to the motor 91 and to turn on the electric current of the clutch 93.

Figure 7:
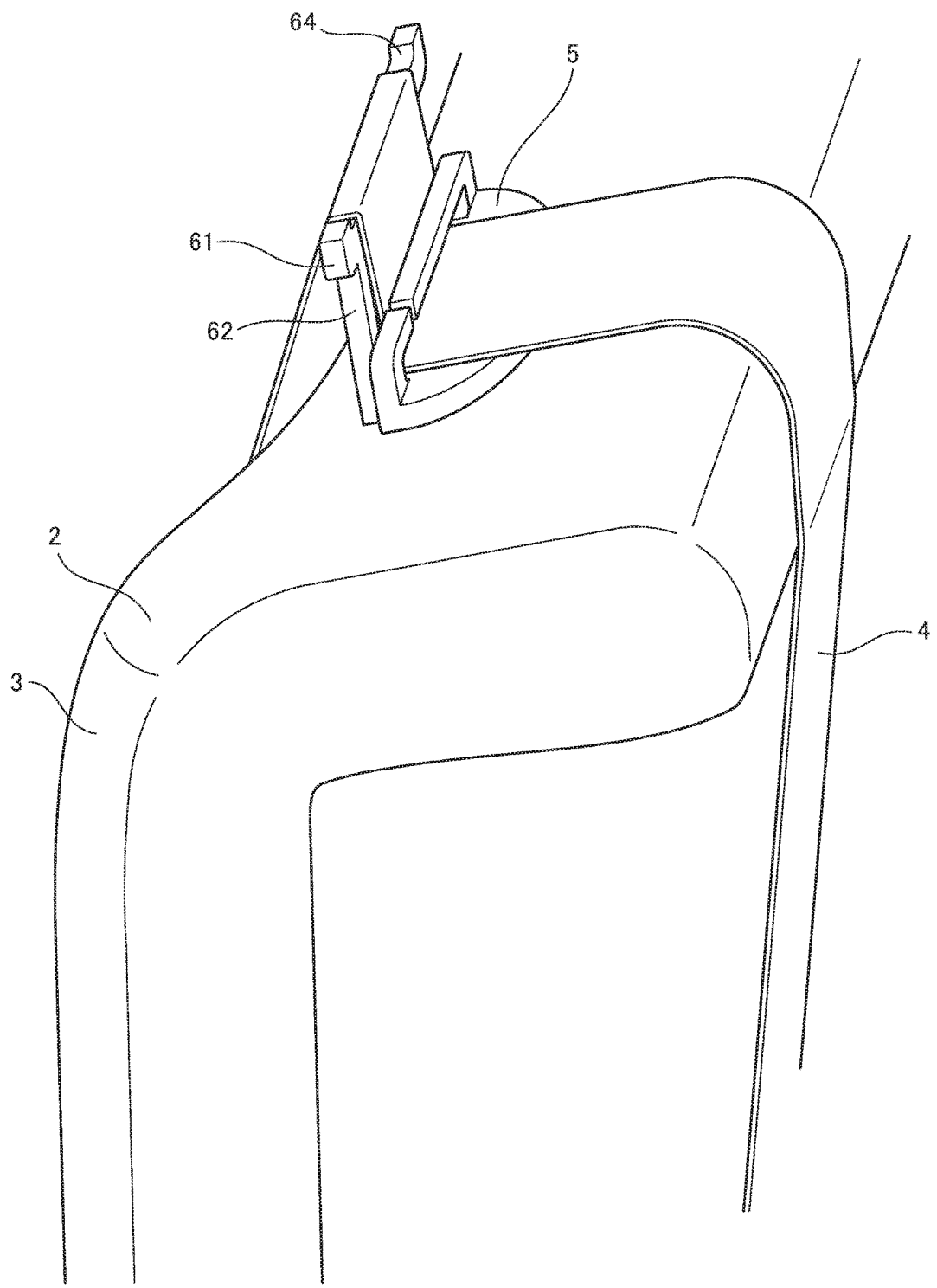
FIG. 7 is a perspective view showing a state where the belt supporting part of the assist device according to the first embodiment of the present disclosure is in a protruded position.
Figure 8:
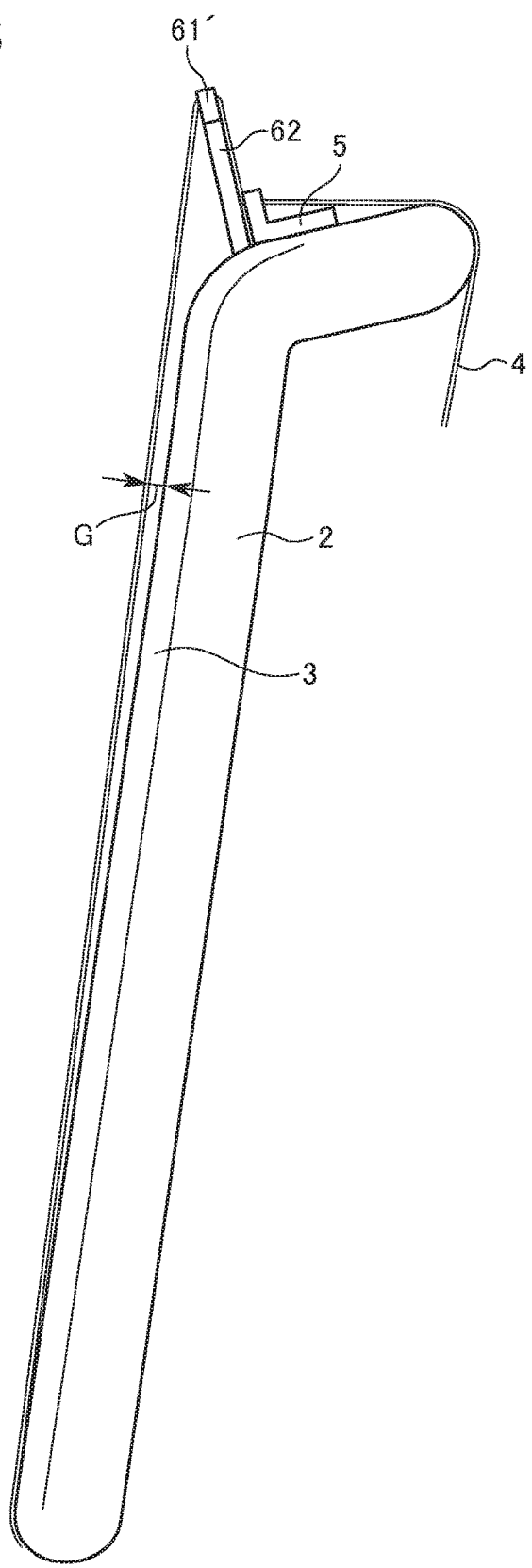
FIG. 8 is a side view of a state where the belt supporting part is in the protruded position, in the assist device according to the first embodiment of the present disclosure.

At this time, the belt support 61 is in a protruded position, and is in a state where a large part of the sliding leg part 62 is exposed above the upper end portion of the seat back 2, as shown in FIG. 7. A protruding height of the belt support 61 above the seat back 2 is about 5 to 10 centimeters (cm), with the upper end thereof being below the upper end face of the headrest 23. In addition, when the belt support 61 is in the protruded position, a Gap G is formed between the forward face of the rear back side part 3 and the seat belt 4, as shown in FIG. 8. That is, a position spaced ahead of the forward face of the rear back side part 3 by the Gap G in the seat orientation corresponds to the position which is easily accessible from a seated person. This gap G becomes a space for inserting a hand when a seated person holds the seat belt 4. In some cases, the gap G is formed in the upper portion of the seat back 2, while in the lower portion, there the gap G is not present between the seat belt 4 and the forward face of the rear back side part 3, and the seat belt 4 is in contact with the forward face of the rear back side part 3, as show in FIG. 8.

Figure 9:
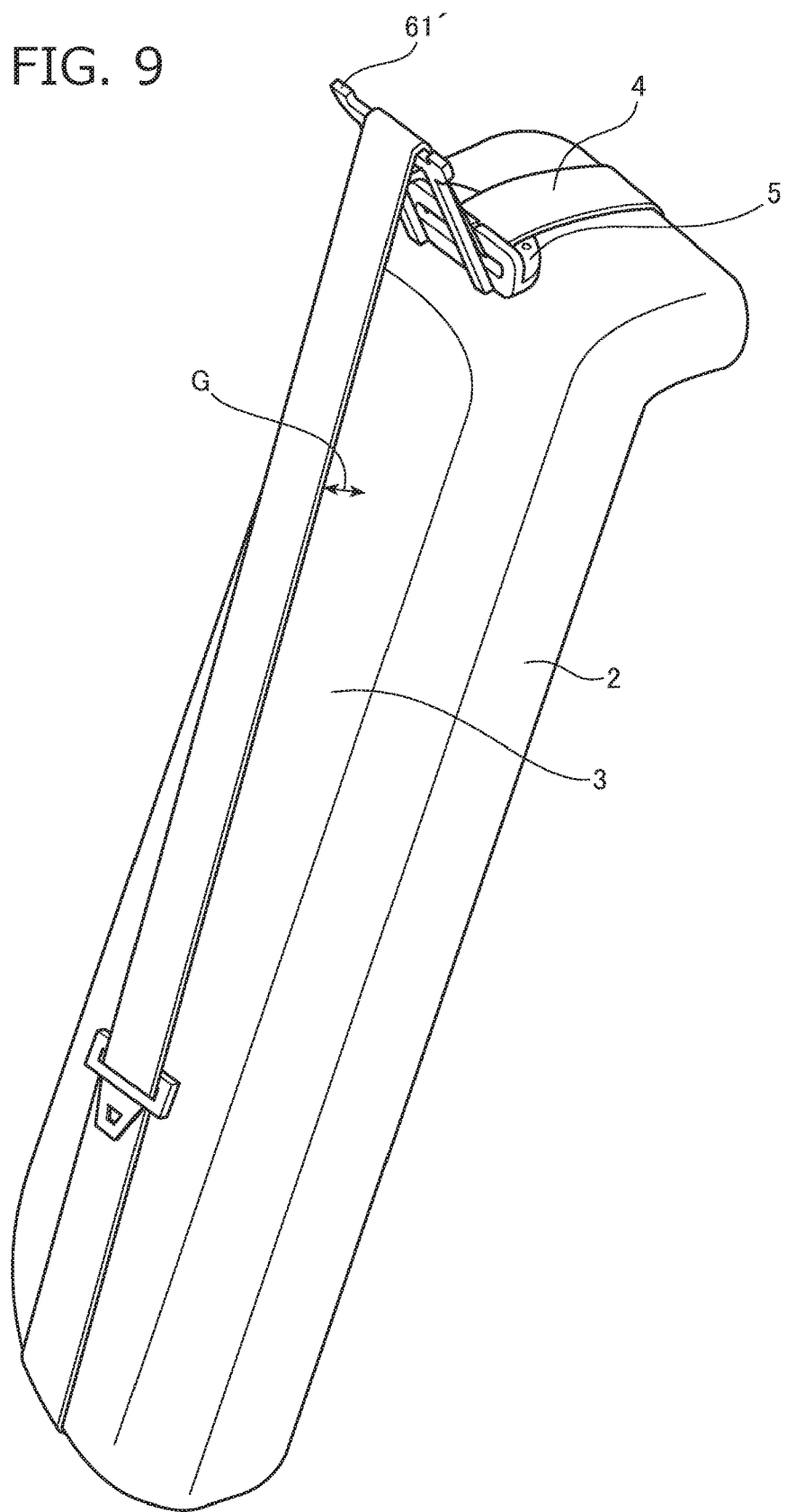
FIG. 9 is a perspective view showing a state where the belt supporting part is in the protruded position, in the assist device according to a modified example of the first embodiment of the present disclosure.

In a case where the opening side of the guiding leg part 72 is disposed in an upper forward position, and the guiding leg part 72 is installed in an inclined manner rather than vertically, such that the upper portion is positioned forward, with the belt support 61 protruding obliquely toward upper forward direction, the forward end of the belt support 61 is positioned behind the forward end face of the headrest 23, as show in FIG. 9. In a case of FIG. 9 where the belt support 61 protrudes obliquely, the gap G is also formed in the upper portion of the seat back 2, between the forward face of the rear back side part 3 and the seat belt 4, as in the case of FIG. 8 where the belt support 61 protrudes vertically. When an OFF signal is transmitted to the driving circuit 92 in Step S5, the rising of the belt support 61 is stopped. At this time, since the electric current of the clutch 93 is still on, the belt support 61 is kept at the position at the time. That is, the belt support 61 is kept at the position, against the urging force of the spring 65.

Subsequently, at Step S6 it is determined whether the buckle switch 97 has been turned on. When the buckle switch 97 is not on (Step S6: No), it is determined that the seated person has not yet fasten the seat belt 4, on the basis of which at Step S7 it is determined whether the vehicular speed sensor 98 has been turned on. When the vehicular speed sensor 98 is not on (Step S7: No), it is determined that the vehicle has not started, on the basis of which at Step S6 it is determined again whether the buckle switch 97 has been turned on. That is, after the belt support 61 is raised, Step S7 is repeated until the seat belt 4 is fastened or the vehicle is started.

When the vehicular speed sensor 98 is turned on (Step S7: Yes), it is determined that the vehicle has started with the seated person having not fastened the seat belt 4, on the basis of which at Step S8 an ON signal is transmitted to the clutch 93 to turn off the electric current of the clutch 93 to lower the belt support 61 down to the upper end face of the seat back 2 by the urging force of the spring 65. After that, at Step S9 an ON signal is transmitted to the driving circuit 92 and the clutch 93 to supply the driving power from the driving circuit 92 to the motor 91, and to turn on the electric current of the clutch 93 to raise the belt support 61 again. In this manner, a seated person is encouraged to fasten the seat belt 4, in a case that a vehicle has started with a seated person having not fastened the seat belt 4, by once lowering and then raising the belt support 61 in Steps S8 and S9. In an embodiment, at this time an announcement is simultaneously provided such as "please fasten the seat belt" or an alarm sound.

When the buckle switch 97 is on (Step S6: Yes), it is determined that a seated person has already fastened the seat belt 4, and it is not necessary to provide assistance in fastening the seat belt 4, on the basis of which at Step S10 an OFF signal is transmitted to the clutch 93 to stop the supply of the electric current to the clutch 93. This releases the connection between the shaft 75a of the gear 75 and the outputting shaft (not illustrated) of the motor 91, and accordingly, the belt support 61 starts lowering by the urging force of the spring 65. Subsequently, at Step S11 it is determined whether the pinching sensor has detected a pinching. When the pinching sensor does not detect a pinching (Step S11: No), it is determined that there is no pinching between the belt support 61 and the upper end face of the seat back 2, and a lowering and a housing into the substrate base 71 of the belt support 61 have been completed without problem, on the basis of which the processing is finished. When the pinching sensor detects a pinching (Step S11: Yes), at Step S9 an ON signal is transmitted to the driving circuit 92 and the clutch 93 to supply the driving power from the driving circuit 92 to the motor 91, and to turn on the electric current of the clutch 93 to raise the belt support 61 again.

Subsequently, at Step S12 it is determined whether the position sensor 99 has detected that the belt support 61 has reached the highest position. When the position sensor 99 does not detect that the belt support 61 has reached the highest position (Step S12: No), the process returns to Step S12, and it is determined whether the position sensor 99 has detected that the belt support 61 has reached the highest position. When the position sensor 99 detects that the belt support 61 has reached the highest position (Step S12: Yes), it is determined that the belt support 61 has risen to a necessary height, on the basis of which at Step S13 an OFF signal is transmitted to the driving circuit 92 and an ON signal to the clutch 93 to stop the supply of the driving power from the driving circuit 92 to the motor 91 and to turn on the electric current of the clutch 93. By this, the rising of the belt support 61 is stopped. At this time, since the electric current of the clutch 93 is still on, the belt support 61 is kept at the position at the time. That is, the belt support 61 is kept at the position, against the urging force of the spring 65. Then, the processing is finished.

Although the lowering of the belt support 61 is performed by the urging force of the spring 65 by turning off the electric current of the clutch 93 in the present embodiment, in another embodiment, the belt support 61 is lowered by reversely rotating the motor 91. In yet another embodiment, a configuration is provided with a locking member (not illustrated) for locking the belt support 61 to the lowest position and a spring (not illustrated) for urging the belt support 61 upward, such that when a signal of detecting the seating of a seated person is received from the seating switch 96, the locking of the locking member is released and the belt support 61 jumps out upward by the spring. In this embodiment, if the locking member is configured to be lockable by a seated person by manually pressing the belt support 61 from above, the motor 91 and the clutch 93 become not necessary, which allows the assist device 6 have a simple configuration. Additionally, in this case, only the operation of returning into the substrate base 71 of the belt support 61 may be performed by a motor (not illustrated).

Figure 10:
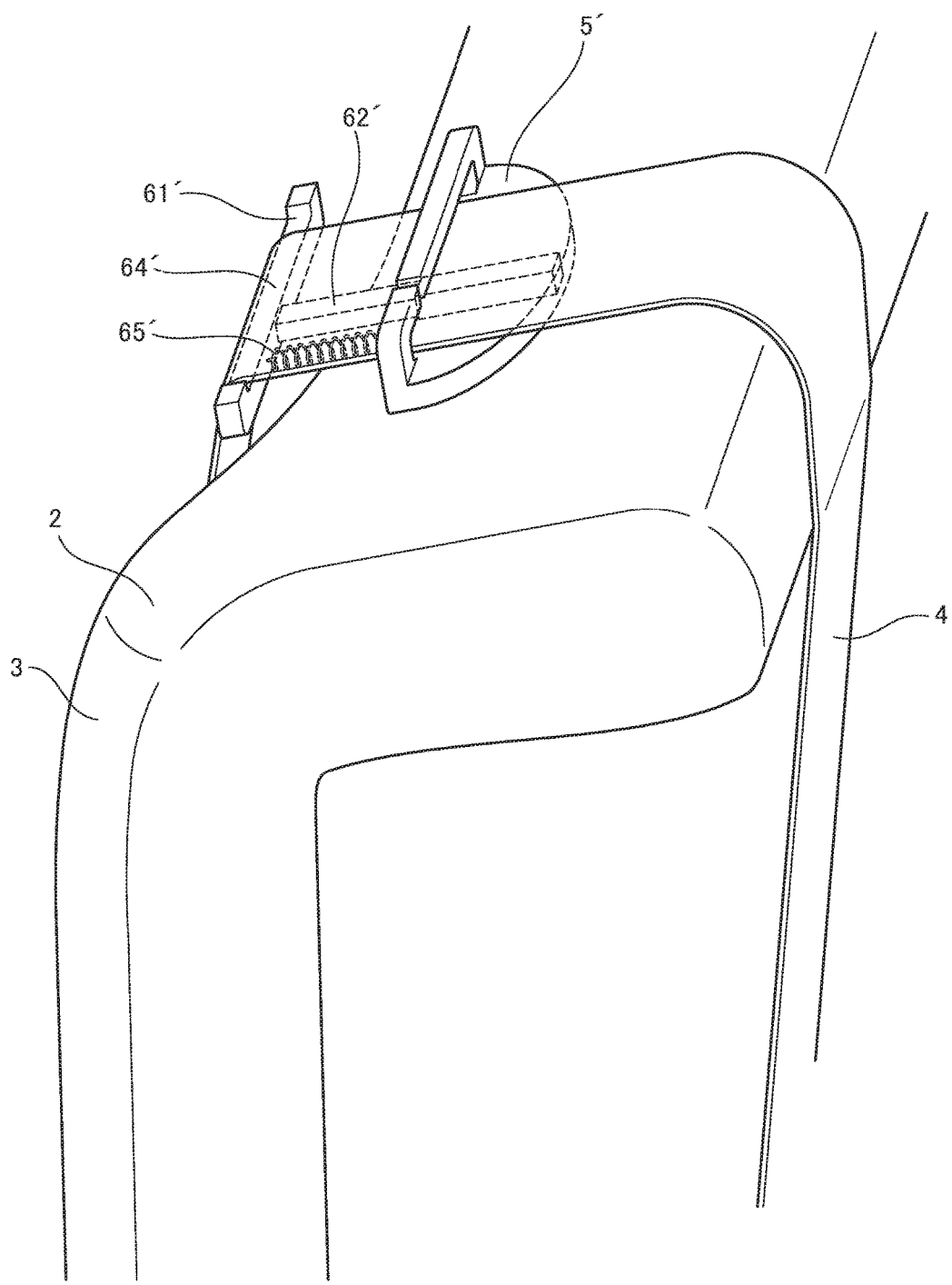
FIG. 10 is a perspective, schematic view showing the assist device according to a modified example of the first embodiment of the present disclosure.

Although the belt support 61 is moved in the up and down direction in this embodiment, in another embodiment, a belt support 61' is moved forward in the seat orientation when a seated person wears the belt, as shown in FIG. 10. In the example of FIG. 10, the belt support 61' is formed with a substantially T-shaped body which is integrally formed with a substantially rod-shaped belt supporting part 64' having a rectangular section, and a rod-shaped sliding leg part 62' having a rectangular section which extends rearward in the seat orientation from the center of the belt supporting part 64'. On a board part 51' of a belt guide 5', a sliding hole (not illustrated) having a rectangular section for slidably housing the sliding leg part 62' is formed along the extending direction of the seat belt.

The sliding leg part 62' has a rack (not illustrated) formed along the longitudinal direction, which is meshed with a worm wheel (not illustrated) linked to an output shaft of a motor (not illustrated) disposed in the seat back 2 side, through an electromagnetic clutch (not illustrated). A spring 65' for urging the belt supporting part 64' toward the belt guide 5' is bridged between the face of the belt supporting part 64' in the belt guide 5' side and the face of the belt guide 5' in the belt supporting part 64' side, as shown in FIG. 10. By being thus formed, when the motor (not illustrated) rotates in a state that the clutch (not illustrated) is on, the rotational movement thereof is transmitted by the worm wheel and the rack (not illustrated), to move the sliding leg part 62' forward in the seat orientation to be disposed in a position of FIG. 10 which is stretched out from the seat back 2 by 5 to 10 cm. This makes a gap between the seat back 2 and the seat belt 4, which allows a seated person to easily hold the seat belt 4, when the seated person fastens the seat belt 4. At this time, the forward end of the belt support 61' is positioned behind the forward end face of the headrest 23. When the buckle switch 97 detects that the seat belt 4 has been fastened, the clutch (not illustrated) is turned off and the belt supporting part 64' returns to the original position similar to FIG. 6 by the urging force of the spring 65'.

Second Embodiment

Figure 11:
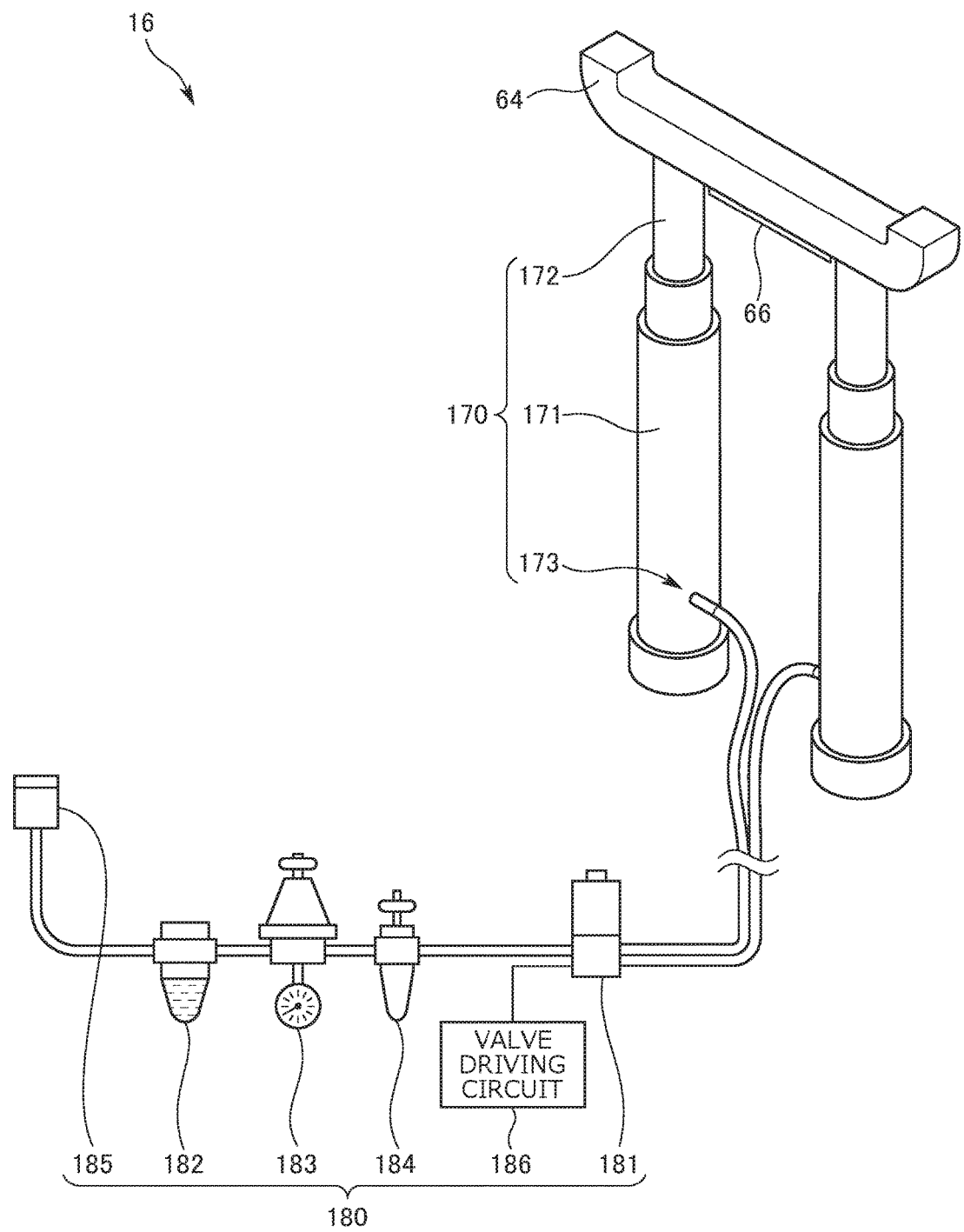
FIG. 11 is a perspective view of the assist device according to the second embodiment of the present disclosure.

A second embodiment of the present disclosure is now described on the basis of FIG. 11. The present embodiment is an example of driving upward/downward the belt supporting part 64 of an assist device 16 as a seat belt assist device by use of an air cylinder, but the air cylinder may be substituted with a hydraulic cylinder. Although the belt supporting part 64 is driven upward/downward in the present embodiment, in another embodiment, the belt supporting part 64 is driven forward/rearward to be protruded forward in the seat orientation. FIG. 11 shows the assist device 16 as the seat belt assist device according to the second embodiment. The assist device 16 is provided ahead of the belt guide 5 in the seat orientation, instead of the assist device 6 of the first embodiment. The assist device 16 includes, as main components, a pair of air cylinders 170 which is mounted on the frame (not illustrated) of the seat back 2 and is provided inside the seat back 2, a belt supporting part 64 installed on the distal ends of a pair of piston rods 172 of the pair of air cylinders 170, to bridge the pair of piston rods 172, and an air controlling unit 180 for controlling the air pressure of the pair of air cylinders 170, as shown in FIG. 11. The pair of air cylinders 170 is formed with a publicly known single-acting cylinder of an extrusion type. The single-acting cylinder refers to a cylinder which reciprocates by an air pressure on the way forth and by a force of spring on the way back. The extrusion type refers to those in a type in which a rod reciprocates by a force of air in pushing and by a force of spring in pulling. In this connection, the present embodiment uses the single-acting cylinder but a cylinder is not limited thereto. In another embodiment, a cylinder of another type is used, such as a multiple-acting cylinder which reciprocates by a force of air both on the way back and forth.

The air cylinder 170 includes, as main components: a tube 171 formed with a cylindrical shape with the upper and lower ends sealed; a piston (not illustrated) which is housed inside the tube 171, formed with a substantially disc-like shape having an outer diameter substantially equal to the inner diameter of the tube 171, and slides along the tube 171 in the longitudinal direction of the tube 171; a piston rod 172 which is fixed to the center of one of the faces of the piston, and extends through the center of the tube 171 along the longitudinal direction of the tube 171, and protrudes from the upper end of the tube 171; a spring (not illustrated) having both ends fixed to the lower end of the piston and to the lower end of the inner wall of the tube 171, which urges the piston and the piston rod 172 in a direction toward the lower end of the tube 171; and a port 173 provided in the vicinity of the lower end of the side wall face of the tube 171, which is formed as a hole penetrating through the side wall face of the tube 171.

The air controlling unit 180 is provided with: a solenoid valve (e.g., electromagnetic valve) 181 which functions by a passing of an electric current and controls a forward movement of the piston; an air filter 182; an air unit 183 which includes a pressure regulating valve and a pressure gauge; a lubricator 184 for refueling the pressure regulating valve with a small amount of oil; a compressor 185 which works as an air source; a valve driving circuit 186 for driving the solenoid valve 181. The air controlling unit 180 is connected to the port 173 of the air cylinder 170 through a piping 187. The belt supporting part 64 has the same configuration with the first embodiment, including the pinching sensor 66 mounted on the lower face, and therefore, description thereof is omitted.

Figure 12:
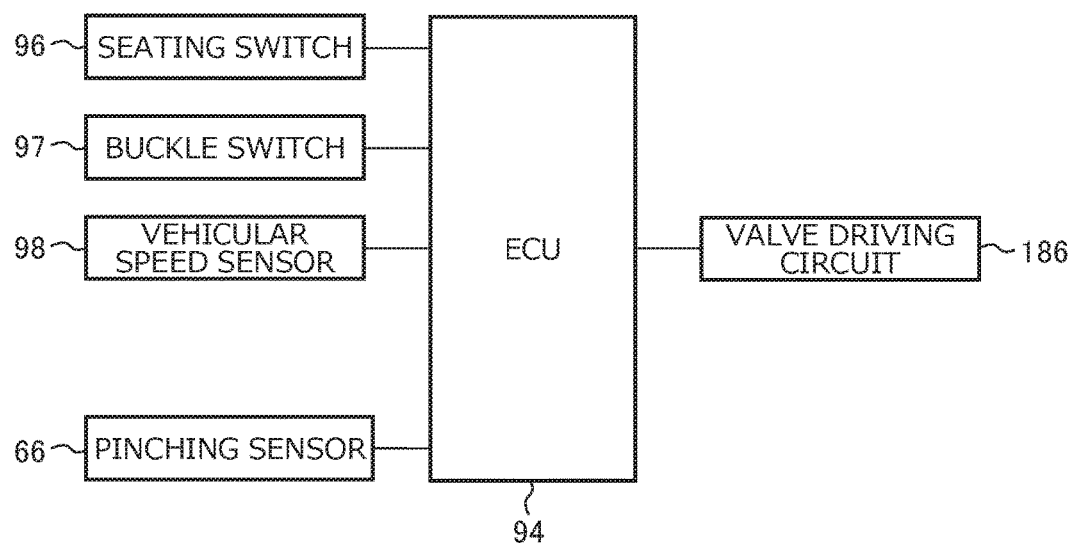
FIG. 12 is a block diagram showing an electrical structure of the assist device according to the second embodiment of the present disclosure.

The assist device 16 is provided with: the valve driving circuit 186 for driving the solenoid valve 181 by passing an electric current through the solenoid valve 181; and an ECU (electronic control circuit) 94 as a control section, as show in FIG. 12. The ECU 94 of FIG. 12 is connected to a seating switch 96, a buckle switch 97, a vehicular speed sensor 98, a position sensor 99, and a pinching sensor 66. Configuration of these switches and sensors is the same with the first embodiment, and therefore, description thereof is omitted.

Figure 13:
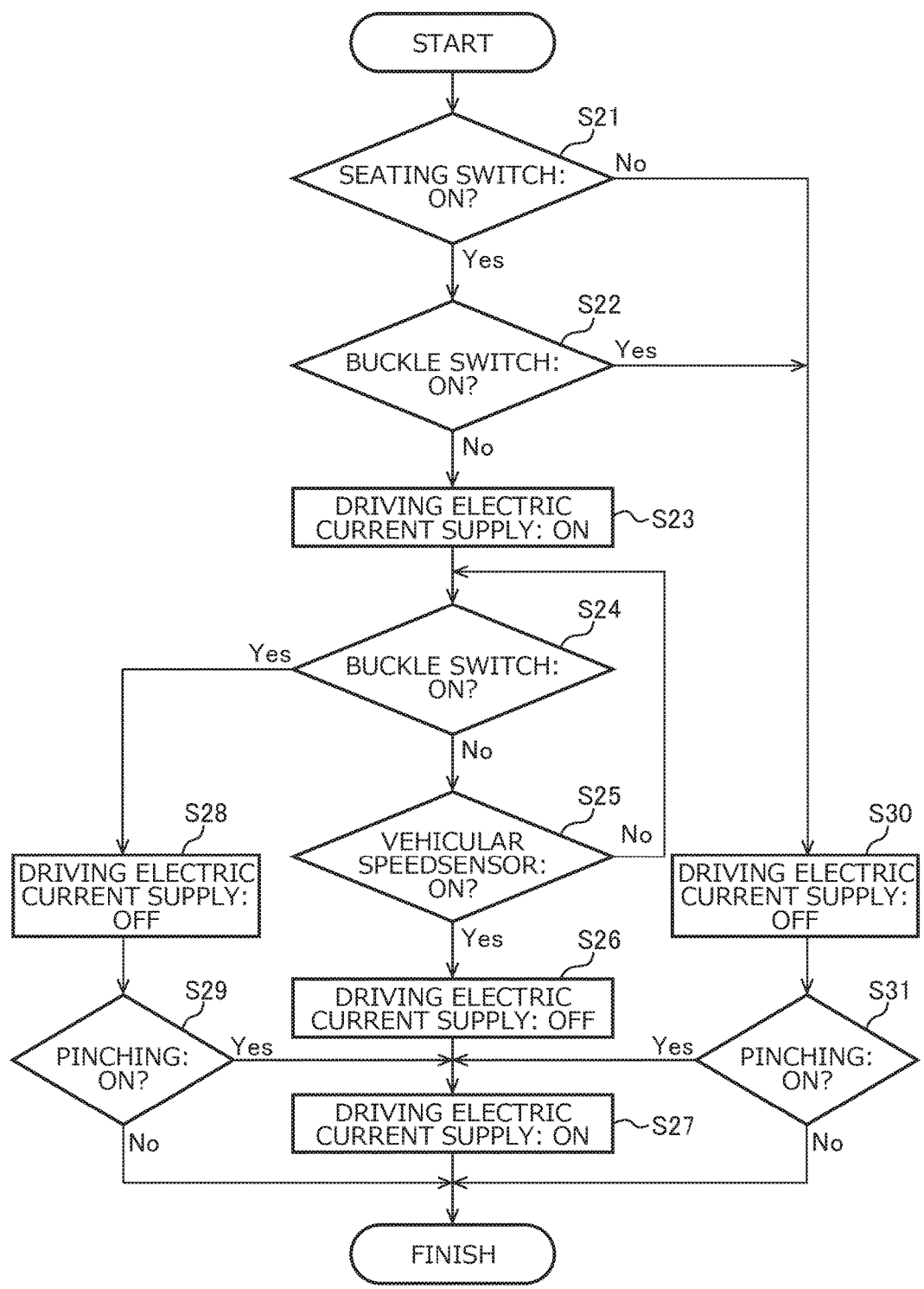
FIG. 13 is a flow diagram showing a method for control of the assist device according to the second embodiment of the present disclosure.

Operation of the assist device 16 of the present embodiment is now described by using the flowchart of FIG. 13. Processing of FIG. 13 is controlled by the ECU 94 of FIG. 12 and is repeatedly performed during a time when an ignition switch of a vehicle is on. In a normal time, the assist device 16 is in the lowest normal position where the belt supporting part 64 is adjacent to the belt guide 5 at the same height, and in a state where only the belt supporting part 64 protrudes and exposed outside the seat back 2, as in FIG. 6 of the first embodiment. At this time, the seat belt 4 is substantially in close contact with a surface of the seat back 2.

When the processing of the flowchart of FIG. 13 is started, firstly, at Step S21 it is determined whether the seating switch 96 is on. When the seating switch 96 is not on (Step S21: No), it is determined that no person is seated on the seat S, and accordingly the belt supporting part 64 should be in the lowered position, on the basis of which at Step S30 an OFF signal is transmitted to the valve driving circuit 186 to stop the supply of the driving electric current from the valve driving circuit 186 to the solenoid valve 181. This lowers an air pressure which has been pushing up the piston (not illustrated) of the air cylinder 170, and the piston (not illustrated) is lowered by the urging force of the spring provided inside the air cylinder 170, and accordingly, the piston rod 172 and the belt supporting part 64 start lowering. Subsequently, at Step S31 it is determined whether the pinching sensor 66 has detected a pinching. When the pinching sensor 66 did not detect a pinching (Step S31: No), it is determined that there is no pinching between the belt supporting part 64 and the upper end face of the seat back 2, and a lowering of the belt supporting part 64 has been completed without problem, on the basis of which the processing is finished. When the pinching sensor 66 detects a pinching (Step S31: Yes), at Step S27 an ON signal is transmitted to the valve driving circuit 186 to supply the driving power from the valve driving circuit 186 to the solenoid valve 181, to introduce air into the lower side of inside of the air cylinder 170 below the piston (not illustrated), through the port 173. By this, the piston (not illustrated) rises to raise the belt supporting part 64 again. When the seating switch 96 is on (Step S21: Yes), it is determined that a seated person is seated on the seat S, on the basis of which at Step S22 it is determined whether the buckle switch 97 in the position corresponding to the seating switch 96 which is on has been turned on.

When the buckle switch 97 is on (Step S22: Yes), it is determined that a seated person who is seated on the seat S has fastened the seat belt 4, and accordingly the belt supporting part 64 should be in the lowered position, on the basis of which at Step S30 an OFF signal is transmitted to the valve driving circuit 186 to stop the supply of the driving electric current from the valve driving circuit 186 to the solenoid valve 181. Subsequently, at Step S31 it is determined whether the pinching sensor 66 has detected a pinching. When the pinching sensor 66 did not detect a pinching (Step S31: No), it is determined that there is no pinching between the belt supporting part 64 and the upper end face of the seat back 2, and a lowering of the belt supporting part 64 has been completed without problem, on the basis of which the processing is finished. When the pinching sensor detects a pinching 66 (Step S31: Yes), at Step S27 an ON signal is transmitted to the valve driving circuit 186 to supply the driving power from the valve driving circuit 186 to the solenoid valve 181, to introduce air into the lower side of inside of the air cylinder 170 below the piston (not illustrated), through the port 173, by which the piston (not illustrated) rises to raise the belt supporting part 64 again.

When the buckle switch 97 is not on (Step S22: No), it is determined that a seated person has been seated but has not yet fastened the seat belt 4, on the basis of which at Step S23 an ON signal is transmitted to the valve driving circuit 186 to supply the driving power from the valve driving circuit 186 to the solenoid valve 181, to introduce air into the lower side of inside of the air cylinder 170 below the piston (not illustrated), through the port 173. By this, the piston (not illustrated) rises to raise the belt supporting part 64. In this case, a pressure in the lower side of inside of the air cylinder 170 below the piston (not illustrated) is controlled by the air unit 183 of the air controlling unit 180.

Subsequently, at Step S24 it is determined whether the buckle switch 97 has been turned on. When the buckle switch 97 is not on (Step S24: No), it is determined that a seated person has not yet fastened the seat belt 4, on the basis of which at Step S25 it is determined whether the vehicular speed sensor 98 has been turned on. When the vehicular speed sensor 98 is not on (Step S25: No), it is determined that the vehicle has not started, on the basis of which at Step S24 it is determined again whether the buckle switch 97 has been turned on. That is, after the belt supporting part 64 is raised, Step S25 is repeated until the seat belt 4 is fastened or the vehicle is started.

When the vehicular speed sensor 98 is on (Step S25: Yes), it is determined that the vehicle has started with the seated person having not fastened the seat belt 4, on the basis of which at Step S26 an OFF signal is transmitted to the valve driving circuit 186 to stop the supply of the driving electric current from the valve driving circuit 186 to the solenoid valve 181, to lower the belt supporting part 64 down to the upper end face of the seat back 2. After that, at Step S27 an ON signal is transmitted to the valve driving circuit 186 to supply the driving power from the valve driving circuit 186 to the solenoid valve 181, to introduce an air into the lower side of inside of the air cylinder 170 below the piston (not illustrated), through the port 173. By this, the piston (not illustrated) rises to raise the belt supporting part 64 again. In this manner, a seated person is encouraged to fasten the seat belt 4, in a case that a vehicle has started with a seated person having not fastened the seat belt 4, by once lowering and then raising the belt supporting part 64, in Steps S26 and S27. In an embodiment, at this time an announcement is simultaneously given, such as "please fasten the seat belt" or an alarm sound.

When the buckle switch 97 is on (Step S24: Yes), it is determined that a seated person has already fastened the seat belt 4, and it is not necessary to provide assistance in fastening the seat belt 4, on the basis of which at Step S28 an OFF signal is transmitted to the valve driving circuit 186 to stop the supply of the driving electric current from the valve driving circuit 186 to the solenoid valve 181. This lowers an air pressure which has been pushing up the piston (not illustrated) of the air cylinder 170, and the piston (not illustrated) is lowered by the urging force of the spring provided inside the air cylinder 170, and accordingly, the piston rod 172 and the belt supporting part 64 start lowering. Subsequently, at Step S29 it is determined whether the pinching sensor has detected a pinching. When the pinching sensor does not detect a pinching (Step S29: No), it is determined that there is no pinching between the belt supporting part 64 and the upper end face of the seat back 2, and a lowering of the belt supporting part 64 has been completed without problem, on the basis of which the processing is finished. When the pinching sensor detects a pinching (Step S29: Yes), at Step S27 an ON signal is transmitted to the valve driving circuit 186 to supply the driving power from the valve driving circuit 186 to the solenoid valve 181, to introduce air into the lower side of inside of the air cylinder 170 below the piston (not illustrated), through the port 173. By this, the piston (not illustrated) rises to raise the belt supporting part 64 again. Then, the processing is finished.

Third Embodiment

Figure 14:
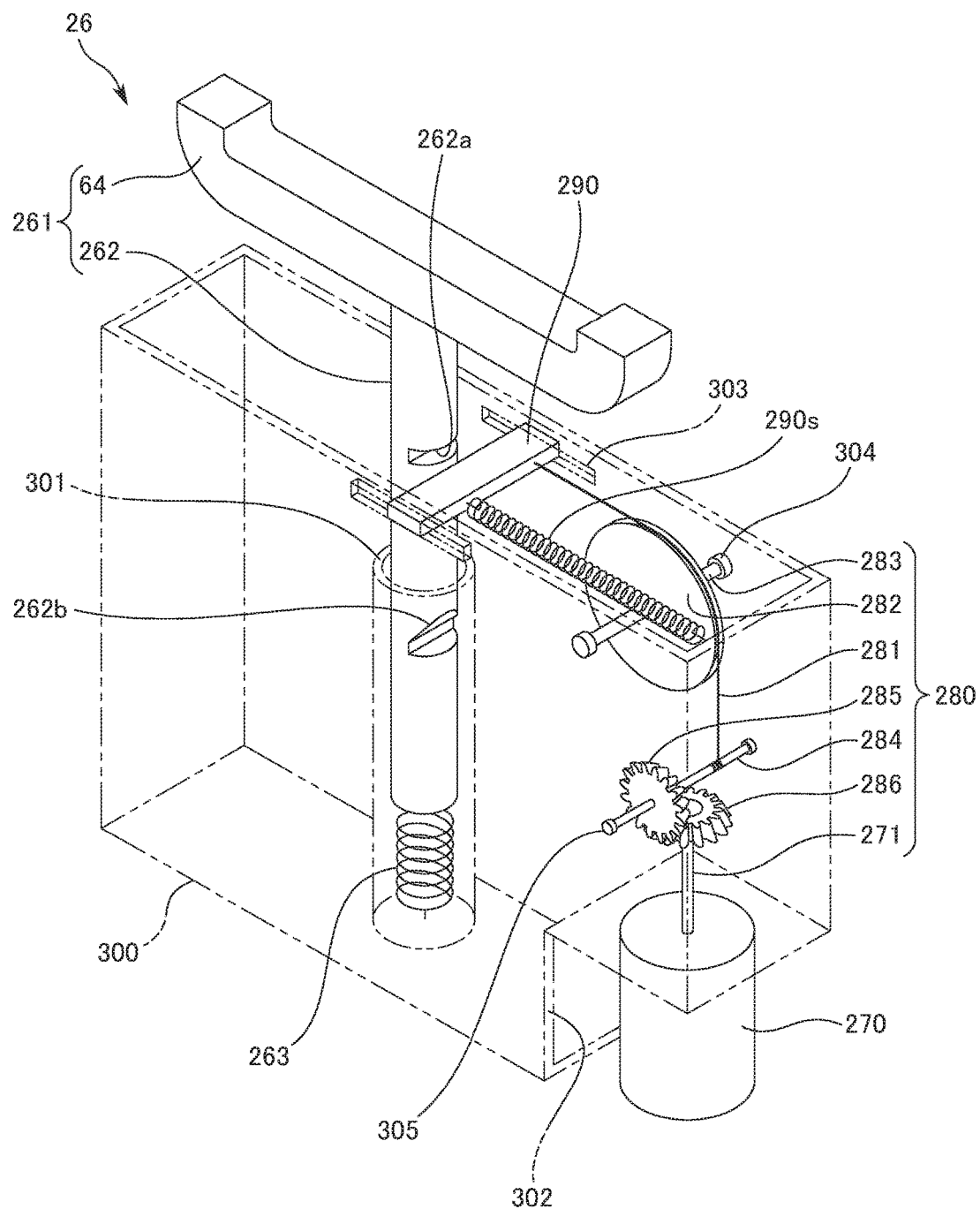
FIG. 14 is a perspective, schematic view of the assist device according to the third embodiment of the present disclosure.

A third embodiment of the present disclosure is now described on the basis of FIG. 14. The present embodiment is an example of driving upward/downward a belt supporting part 64 of an assisting device 26 as a seat belt assist device by a spring and a motor. Although the belt supporting part 64 is driven upward/downward in the present embodiment, in another embodiment, the belt supporting part 64 is driven forward/rearward to be protruded forward in the seat orientation. FIG. 14 shows the assist device 26 according to the third embodiment. The assist device 26 is provided ahead of the belt guide 5 in the seat orientation, instead of the assist device 6 of the first embodiment. The assist device 26 includes, as main components: a motor 270; a plate driving device 280 for converting a rotational movement of the motor 270 into a linear movement of a plate 29; a plate 290 which is driven by the plate driving device 280 and locked with locking grooves 262*a,b* which are provided on a belt support 261; the belt support 261 which moves up and down on the upper end of the seat back 2; and a belt support case 300 for housing the plate driving device 280 and to be a guide for the belt support 261, as shown in FIG. 14.

Figure 15:
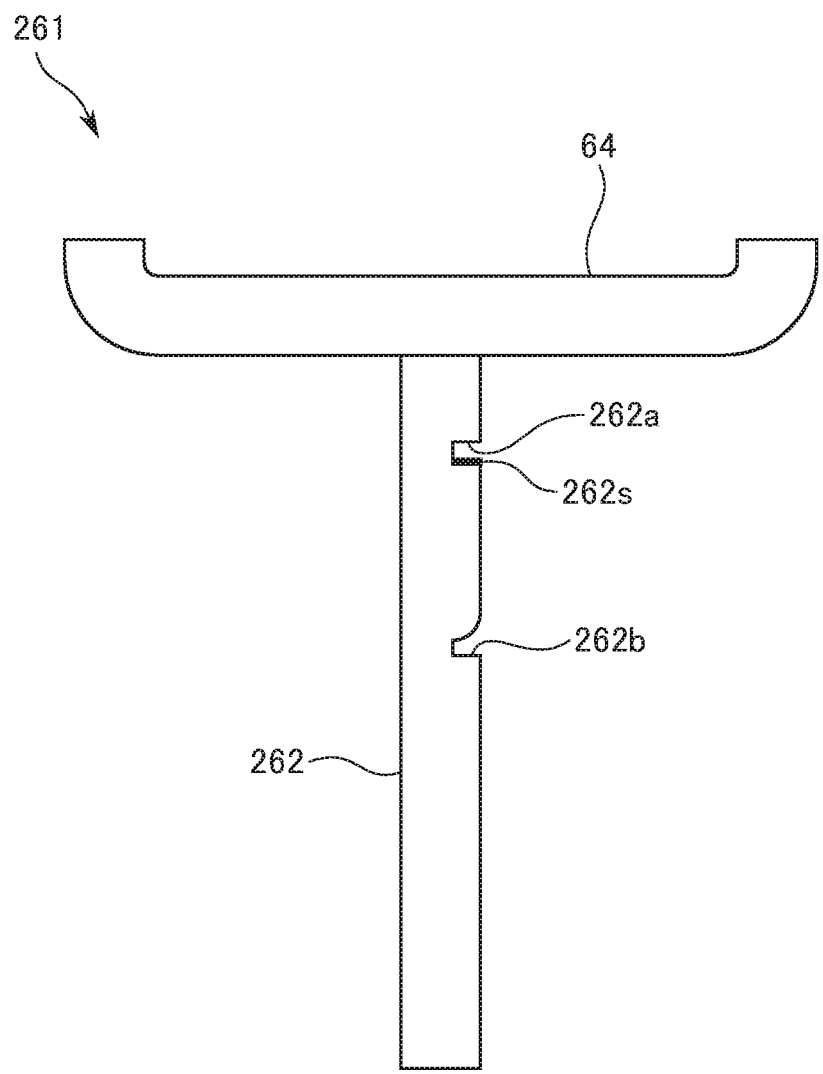
FIG. 15 is a side view of the belt support according to the third embodiment of the present disclosure.

The belt support 261 is formed with a substantially T-shaped body made of a hard resin, and provided with a single leg part 262, and the belt supporting part 64 which is provided on the upper end of the leg part 262 and extends in the right and left direction. The leg part 262 is formed with a long cylindrical shape, and has the locking groove 262*a* formed on a position slightly below the upper end of the side face thereof inside the seat, which extends perpendicularly to the extending direction of the leg part 262, as shown in FIG. 14. In addition, another locking groove 262b is formed 5 to 10 cm below the locking groove 262a, such that the grooves are arranged in line in the extending direction of the leg part 262. As shown in the side view of the belt support 261 of FIG. 15, the locking groove 262a has a square C-shape section, and is formed with a shape substantially identical to a longitudinal section of the plate 290 which is configured to be locked with the locking groove 262a. Locking groove 262b has an upper wall formed with a curved face which is convex toward a lower forward direction, and a lower wall formed with a plane perpendicular to the extending direction of the leg part 262. Since the locking groove 262b has the upper wall formed with a curved face which is convex toward the lower forward direction, attaching/detaching of the plate 290 from/toward above the leg part 262 is facilitated. The locking groove 262b is also formed into a configuration such that when the plate 290 is locked inside, a gap is formed above the plate 290 such that the width of the gap is gradually broadened outward. On the lower face of the locking groove 262a, a position sensor 262s formed with a contact-type touch sensor is fixed as shown in FIG. 15, configured to detect whether the plate 290 is locked with the locking groove 262a.

The belt support case 300 is formed with a box made of resin having a rectangular shape with an opened top as shown in FIG. 14, the inner face of which is provided with: a belt support guide 301 for housing the leg part 262 of the belt support 261 inside; a motor mounting hole 302 which is a position cut off for mounting the motor 270; a pair of guiding grooves 303 for guiding the sliding of the plate 290; a bearing 304 for receiving a drum shaft of a pulley; and a bearing 305 for receiving a shaft of the second bevel gear. The belt support guide 301 is formed with a hollow cylindrical body having an inner diameter slightly larger than the leg part 262, and extends from the lower end face of the belt support case 300 to a position slightly lowered from the mounting position of the plate 290.

The motor 270 is formed with a publicly known small type motor and provided with a motor rotating shaft 271. The plate 290 is formed with a resin thin board slightly thinner than a thickness for the groove of the locking groove 262a. The both end portions of the plate 290 in a direction perpendicular to the extending direction of the belt supporting part 64 are slidably inserted into the pair of guiding grooves 303 which are provided on the inner wall of the belt support case 300. To an end portion of the plate 290, in the opposite side of the belt support 261, one of the ends of a spring 290s formed with a compression coil spring and one of the ends of a wire 281 are fixed, as shown in FIG. 14. The other end of the spring 290s is fixed to the inner wall of the belt support case 300, as shown in FIG. 14. The spring 290s and the wire 281 extend in parallel with the belt supporting part 64 at the portions fixed to the plate 290.

The plate driving device 280 is provided with: a wire 281 having one of the ends connected to the plate 290 and extending in the horizontal direction from the plate 290; a disc-shaped drum 282 for converting the extending direction of the wire 281 from the horizontal direction into the vertical direction; a second bevel gear rotating shaft 284 to which an end of the wire 281 in the opposite side of the plate 290 is connected; a second bevel gear 285 having the second bevel gear rotating shaft 284 as a rotating shaft; and a first bevel gear 286 meshed with the second bevel gear 285 which has an axial angle perpendicular to that of the second bevel gear 285, as shown in FIG. 14.

The first bevel gear 286 is connected to the motor rotating shaft 271 to be rotatable with the motor rotating shaft 271 as an axis. The drum 282 is provided with a drum rotating shaft 283 which extends perpendicularly to the extending direction of the belt supporting part 64. The both ends of the drum rotating shaft 283 are set to a pair of bearings 304 provided on the inner wall of the belt support case 300. To the lower end of the leg part 262, the upper end of a spring 263 formed with a compression coil spring is fixed, and the lower end of the spring 263 is fixed to the bottom face of the belt support case 300, as shown in FIG. 14. The spring 263 is configured to bias the leg part 262 upward, and to be elongated by about 5 to 10 cm when a force of compressing the spring 263 is removed.

Figure 16:
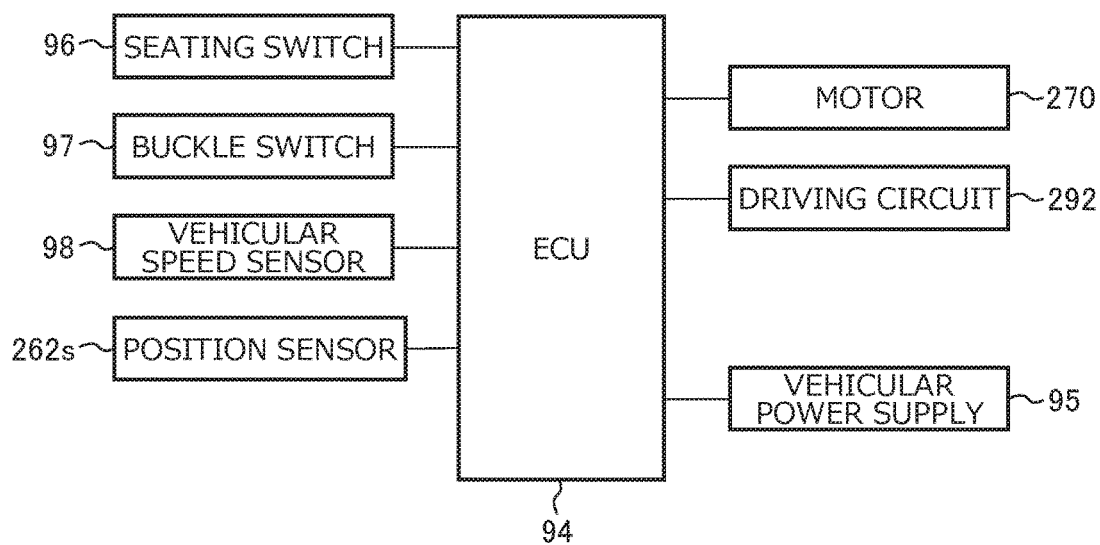
FIG. 16 is a block diagram showing an electrical structure of the assist device according to the third embodiment of the present disclosure.

The assist device 26 is also provided with a driving circuit 292 for supplying a driving power to the motor 270, and an ECU (electronic control circuit) 94 as a control section, as shown in FIG. 16. The motor 270 is connected to a vehicular power supply 95 through the driving circuit 292. The ECU 94 controls functioning of the motor 270, in other words, the up and down movement of the belt support 261, by controlling the driving power supplied from the driving circuit 292 to the motor 270. The ECU 94 is connected to a seating switch 96, a buckle switch 97, a vehicular speed sensor 98, and a position sensor 262s. Configuration of these switches and sensors is the same as described above with respect to the first embodiment, and therefore, description thereof is omitted.

An outline of operation of the assist device 26 of the present embodiment is now described. The assist device 26 is normally in a state urged by the spring 263, with the plate 290 being locked with the upper locking groove 262a. When it comes to a predetermined condition such that the seating switch 96 is turned on, a driving power is supplied to the motor 270 by the ECU 94 for a predetermined time, such as for 0.2 seconds. This rotates the motor rotating shaft 271, and the rotational movement of the motor rotating shaft 271 is transmitted to the second bevel gear rotating shaft 284 through the first bevel gear 286 and the second bevel gear 285. The wire 281 is drawn downward by being wound around the second bevel gear rotating shaft 284, and this force is transmitted to the plate 290 through the wire 281 and the drum 282. The plate 290 horizontally moves in a direction separating from the leg part 262 along the guiding grooves 303 against the biasing force of the spring 290s, and the end portion thereof is detached from the locking groove 262a. FIG. 14 shows a moment where the plate 290 was detached from the locking groove 262a. The detachment of the plate 290 from the locking groove 262a removes the force which has fastened the belt support 261 to a position along the seat upper end, and the belt support 261 moves in a manner to jump out upward by the biasing force of the spring 263. When the driving of the motor 270 is stopped, the plate 290 is urged toward the leg part 260 by the urging force of the spring 290s, and then pushed in and locked with the locking groove 262b which has been raised by the urging force of the spring 263.

When a seated person fastens the seat belt 4, the belt supporting part 64 is pushed downward against the urging force of the spring 263, by a pressure of the seat belt 4. The plate 290 moves toward the upper outer side, along the upper wall of the locking groove 262b. Since the upper wall of the locking groove 262b is formed curvedly to stretch out toward the lower forward direction, the plate 290 is allowed to be pulled out with a relatively small force, when it is pulled out upward. When the belt support 261 is lowered to the position where the locking groove 262a is adjacent to the plate 290, the plate 290 is locked with the locking groove 262a by the urging force of the spring 290s, which will work as a stopper, and the belt support 261 is housed in the original position.

Operation of the assist device 26 of the present embodiment is now described by using the flowchart of FIG. 17. Processing of FIG. 17 is controlled by the ECU 94 and is repeatedly performed during a time when an ignition switch of a vehicle is on. In a normal time, the assist device 26 is in the lowest normal position where the belt supporting part 64 is adjacent to the belt guide 5 at the same height, and only the belt supporting part 64 protrudes and is exposed outside the seat back 2, as in FIG. 6 of the first embodiment. At this time, the seat belt 4 is substantially in close contact with a surface of the seat back 2.

When the processing of the flowchart of FIG. 17 is started, firstly, at Step S41 it is determined whether the position sensor 262s is on. When the position sensor is not on (Step S41: No), it is determined that the plate 290 is not locked with the upper locking groove 262a, and the belt supporting part 64 is in a raised state, and accordingly, it is not necessary to raise the belt supporting part 64, on the basis of which the processing is finished. When the position sensor is on (Step S41: Yes), it is determined that the plate 290 is locked with the upper locking groove 262a, and the belt support 261 is in a lowered normal position, on the basis of which at Step S42 it is determined whether the seating switch 96 is on.

When the seating switch 96 is not on (Step S42: No), it is determined that no person is seated on the seat S, and accordingly the belt supporting part 64 should be left in the lowered normal position, on the basis of which the processing is finished. When the seating switch 96 is on (Step S42: Yes), it is determined that a seated person is seated on the seat S, on the basis of which at Step S43 it is determined whether the buckle switch 97 in the position corresponding to the seating switch 96 which is on has been turned on.

When the buckle switch 97 is on (Step S43: Yes), it is determined that a seated person who is seated on the seat S has fastened the seat belt 4, and therefore the belt supporting part 64 should be left in the lowered position, on the basis of which the processing is finished.

When the buckle switch 97 is not on (Step S43: No), it is determined that a seated person has been seated but has not yet fastened the seat belt 4, on the basis of which at Step S44 an ON signal is transmitted to the driving circuit 292 for a predetermined time such as 0.2 seconds, to supply the driving power from the driving circuit 292 to the motor 270 for a predetermined time such as 0.2 seconds, in order to assist the fastening of the seat belt 4. This rotates the motor rotating shaft 271, and the rotational movement of the motor rotating shaft 271 is transmitted to the second bevel gear rotating shaft 284 through the first bevel gear 286 and the second bevel gear 285.

The wire 281 is drawn downward by being wound around the second bevel gear rotating shaft 284, and this force is transmitted to the plate 290 via the wire 281 and the drum 282. The plate 290 horizontally moves in a direction separating from the leg part 262 along the guiding grooves 303 against the urging force of the spring 290s, and the end portion thereof is detached from the locking groove 262a, and the belt support 261 rises. At the same time as the belt support 261 rises, the driving of the motor 270 for a predetermined time such as 0.2 seconds is terminated, and the plate 290 is urged toward the leg part 262 by the spring 290s. The plate 290 is pushed in and locked with the locking groove 262b, and the belt supporting part 64 is stopped at a raised position. Then, the processing is finished. The present embodiment is in a configuration such that the belt support 261 is housed in the lowered normal position by a pressing force from the seat belt 4 at the time the seat belt 4 is fastened. Therefore, when there is a pinching between the belt supporting part 64 and the upper end of the seat S, the belt support 261 is not housed in the normal position, and therefore, the pinching detection using the pinching sensor is not performed.

TABLE OF REFERENCE NUMERALS

S: Vehicular seat
1: Seat cushion
2: Seat back
3: Rear back side part
4: Seat belt
5, 5': Belt guide
6, 16, 26: Assist device
11: Buckle
23: Headrest
23p: Headrest pillar
31: Recess part
32: Armrest
34: Separable part
35: Air bag module
41: Tongue plate
42: Lower end side
43: Upper end side
51, 51': Board part
51a: End portion
51b: Bolt hole
52: Guiding part
52a: Leg part
52b: Upper holding part
52c: Space
61, 61', 261: Belt support
62, 62': Sliding leg part
62a: Groove
63: Rack, position adjuster
64, 64': Belt supporting part
64a: Wall part
64p: Supporting face
65, 65': Spring
66: Pinching sensor
71: Substrate base
72: Guiding leg part
73: Linking board part
74, 75: Gear
75a: Shaft
77: Rotation synchronizing shaft
77a: Bearing
78: Worm gear
79: Worm wheel
80: Cover
81: Protruded part
82: Locking part
91: Motor
92: Driving circuit
93: Clutch
94: ECU
95: Vehicular power supply
96: Seating switch
97: Buckle switch
98: Vehicle speed sensor
99, 262s: Position sensor
170: Air cylinder 171: Tube
172: Piston rod
173: Port
180: Air controlling unit
181: Solenoid valve (Electromagnetic valve)
182: Air filter
183: Air unit
184: Lubricator
185: Compressor
186: Valve driving circuit
187: Piping
261: Belt support
262: Leg part
262a, b: Locking groove
263: Spring
270: Motor
271: Motor rotating shaft
280: Plate driving device
281: Wire
282: Drum
283: Drum rotating shaft
284: Second bevel gear rotating shaft
285: Second bevel gear
286: First bevel gear
290: Plate
290s: Spring
292: Driving circuit
300: Belt support case
301: Belt support guide
302: Motor mounting hole
303: Guiding groove
304: Bearing
305: Bearing

The invention claimed is:

1. A vehicular seat comprising:
a seat back configured to support a back of a seated person;
a seat belt;
a seat belt assist device which is configured to move at least a part of the seat belt to a position easily accessible by a seated person; and
a belt guide that is provided on an upper face of the seat back and into which the seat belt is inserted;
wherein the seat belt assist device comprises a movable member that supports a part of the seat belt and moves between a normal position and a protruded position that protrudes beyond the normal position; and
wherein the movable member is provided on the upper face of the seat back of the seat, with an end portion thereof at a door side of a vehicle being disposed on an end portion of the seat back in the right and left direction of the upper face of the seat back, and a forward end portion thereof being disposed behind a forward end face of the upper face of the seat back; and
wherein when the movable member is in the normal position, an upper end face of the movable member is located at a lower position than an upper end face of the belt guide.

2. The vehicular seat according to claim 1, wherein the protruded position is a position protruded upward beyond the normal position.

3. The vehicular seat according to claim 1, wherein the protruded position is below an upper end face of a headrest of the seat, and above the upper end face of the belt guide.

4. The vehicular seat according to claim 1, wherein the protruded position is a position protruded forward beyond the normal position, and the protruded position is behind a forward end face of a headrest of the seat.

5. The vehicular seat according to claim 1, wherein the movable member comprises a supporting part that supports the seat belt slidably in a longitudinal direction of the seat belt, and a sliding part provided integrally with the supporting part,
wherein the seat back comprises a frame that supports the seat back,
wherein an air bag module is fixed to the frame, and
wherein the sliding part is disposed behind the air bag module in a seat orientation.

6. The vehicular seat according to claim 1, wherein the movable member comprises a supporting part that supports the seat belt slidably in a longitudinal direction of the seat belt, and a sliding part provided integrally with the supporting part,
wherein the vehicular seat comprises a rear seat disposed rearward in the vehicle,
wherein an accommodation recess part for a center armrest, and the center armrest that is configured to be accommodated in the accommodation recess part are provided in a center of the rear seat in the right and left direction of the rear seat, and
wherein the sliding part is disposed in a position where at least a part thereof overlaps with the center armrest in the right and left direction of the seat.

7. The vehicular seat according to claim 1, wherein the movable member comprises a supporting part that supports the seat belt slidably in a longitudinal direction of the seat belt, and a sliding part provided integrally with the supporting part, and
wherein the sliding part is provided on the upper face of the seat back, and slidably inserted into a sliding hole of the seat back which comprises an opening on an upper portion of the seat back.

8. The vehicular seat according to claim 1, wherein an upper portion of the movable member has a U-shape that opens upwards.

9. The vehicular seat according to claim 1, wherein the movable member comprises a supporting part that supports the seat belt slidably in a longitudinal direction of the seat belt, and a sliding part provided integrally with the supporting part,
wherein the sliding part is provided on the upper face of the seat back, and slidably inserted into a sliding hole of the seat back which comprises an opening on an upper portion of the seat back, and
wherein an inner side of the sliding part is provided with a position adjuster configured to adjust a position of the movable member.

10. The vehicular seat according to claim 9, comprising:
a control section that moves the movable member between the normal position and the protruded position on a basis of one or more signals;
wherein the supporting part comprises a pinching detector on a face of the supporting part which faces the seat back, and
wherein the control section stops movement control toward the normal position when a load at the pinching detector exceeds a predetermined threshold value.

11. The vehicular seat according to claim 9, wherein the sliding part is provided in a pair, and the pair of sliding parts is arranged in line along the right and left direction of the seat, the pair of sliding parts being spaced from each other with a predetermined distance therebetween.

12. The vehicular seat according to claim 11, wherein the pair of sliding parts is arranged in line along a direction in which a pair of headrest pillars provided on the seat back is arranged in line.

13. A vehicular seat comprising:
a seat back configured to support a back of a seated person,
a seat belt, and
a seat belt assist device configured to move at least a part of the seat belt to a position easily accessible by the seated person;
wherein the seat belt assist device comprises a movable member that supports a part of the seat belt and moves between a normal position and a protruded position that protrudes beyond the normal position;
wherein the movable member is provided on an upper face of a seat back of the seat, with an end portion thereof at a door side of a vehicle being disposed on an end portion of the seat back in the right and left direction of the upper face of the seat back, and a forward end portion thereof being disposed behind a forward end face of the upper face of the seat back;
wherein the movable member comprises a supporting part that supports the seat belt slidably in a longitudinal direction of the seat belt, and a sliding part provided integrally with the supporting part;
wherein a sliding hole that comprises an opening on an upper portion of the seat back is formed inside the seat back;
wherein the sliding part is provided on the upper face of the seat back, and slidably inserted into the sliding hole,
wherein the seat back comprises a frame that supports the seat back,
wherein an air bag module is fixed to the frame, and
wherein the sliding part is disposed behind the air bag module in a seat orientation.

14. The vehicular seat according to claim 13, wherein when the movable member is in the normal position, the seat belt is in contact with a forward face of the seat back, in the seat orientation, through the upper portion to the lower portion of the seat back, and when the movable member is in the protruded position, a gap is formed between the seat belt and the forward face of the seat back, in the seat orientation.

15. The vehicular seat according to claim 13, comprising:
a rear seat disposed rearward in the vehicle,
wherein an accommodation recess part for a center armrest, and the center armrest that is configured to be accommodated in the accommodation recess part are provided in a center of the rear seat in the right and left direction of the rear seat, and
wherein the sliding part is disposed in a position where at least a part thereof overlaps with the center armrest in the right and left direction of the seat.

16. A seat belt assist device which is configured to move at least a part of a seat belt of a seat for a vehicle to a position easily accessible by a seated person, the seat belt assist device comprising:
a movable member that supports a part of the seat belt and moves between a normal position and a protruded position that protrudes beyond the normal position; and
a control section that moves the movable member between the normal position and the protruded position on a basis of one or more signals;
wherein the movable member is configured to be installed on an upper face of a seat back of the seat, with an end portion of the movable member at a door side of the vehicle being disposed on an end portion of the seat back in the right and left direction of the upper face of the seat back when installed, and a forward end portion of the movable member being disposed behind a forward end face of the upper face of the seat back when installed; and
wherein the control section moves the movable member to the protruded position on a basis of a seating detection signal from a seated person detector which detects that a seated person has been seated on the seat.

17. The seat belt assist device according to claim 16, wherein the control section moves the movable member to the protruded position on a basis of a vehicle driving detection signal, from a vehicular speed detector that detects a vehicular speed of the vehicle, which shows that a vehicular speed of the vehicle is equal to or higher than a predetermined speed.

18. The seat belt assist device according to claim 16, wherein the control section moves the movable member to the normal position on a basis of a belt fastening detection signal from a belt fastening detector which detects that the seat belt has been fastened.

* * * * *